US012676321B2

(12) United States Patent
Lee et al.

(10) Patent No.: US 12,676,321 B2
(45) Date of Patent: Jul. 7, 2026

(54) CELL-MONITORING CONNECTOR FOR FUEL CELL

(71) Applicants:Hyundai Motor Company, Seoul (KR); Kia Corporation, Seoul (KR); Yura Co., Ltd., Hwaseong-si (KR)

(72) Inventors: Jong Jun Lee, Yongin-si (KR); Min Seok Kim, Yangpyeong-gun (KR); Seoung Ho Jung, Yongin-si (KR)

(73) Assignees: Hyundai Motor Company, Seoul (KR); Kia Corporation, Seoul (KR); Yura Co., LTD., Hwaseong-si (KR)

( * ) Notice: Subject to any disclaimer, the term of this patent is extended or adjusted under 35 U.S.C. 154(b) by 609 days.

(21) Appl. No.: 18/312,127

(22) Filed: May 4, 2023

(65) Prior Publication Data

US 2024/0128479 A1     Apr. 18, 2024

(30) Foreign Application Priority Data

Oct. 13, 2022     (KR) ......................... 10-2022-0131292

(51) Int. Cl.
*H01M 8/0247* (2016.01)
*H01M 8/04537* (2016.01)
*H01M 8/2475* (2016.01)

(52) U.S. Cl.
CPC ..... *H01M 8/0247* (2013.01); *H01M 8/04559* (2013.01); *H01M 8/2475* (2013.01)

(58) Field of Classification Search
CPC .. H01M 2250/20; Y02E 60/50; H01R 13/639; H01R 13/641
See application file for complete search history.

(56) References Cited

U.S. PATENT DOCUMENTS

2009/0104503 A1     4/2009   Shirahama
2013/0316560 A1    11/2013   Yoon et al.
2021/0143449 A1*    5/2021   Ohm ................... H01M 8/0247

FOREIGN PATENT DOCUMENTS

JP          5011759 B2      8/2012
KR       101337937 B1     12/2013

* cited by examiner

*Primary Examiner* — Adam A Arciero
(74) *Attorney, Agent, or Firm* — Slater Matsil, LLP

(57) ABSTRACT

An embodiment cell-monitoring connector for a fuel cell in which the cell-monitoring connector is configured to be mounted to unit cells stacked in a first direction is provided. The cell-monitoring connector includes a housing configured to be coupled to a plurality of terminals protruding from side portions of separators included in each of the unit cells toward the cell-monitoring connector in a second direction intersecting the first direction and a connector and terminal position assurance (CTPA) configured to be detachably coupled to the housing, the CTPA including a connector position assurance (CPA) configured to be locked in a groove portion to secure the housing to the plurality of terminals, a terminal position assurance (TPA) configured to be detachably coupled to a front surface of the housing and to allow connection terminals to be press-fitted into the housing, and a connecting portion interconnecting the CPA and the TPA.

20 Claims, 26 Drawing Sheets

CELL-MONITORING CONNECTOR FOR FUEL CELL

CROSS-REFERENCE TO RELATED APPLICATIONS

This application claims the benefit of Korean Patent Application No. 10-2022-0131292, filed on Oct. 13, 2022, which application is hereby incorporated herein by reference.

TECHNICAL FIELD

Embodiments relate to a cell-monitoring connector for a fuel cell.

BACKGROUND

A cell stack of a fuel cell may supply power, generated through electrochemical reaction between air supplied to one surface of a polymer electrolyte membrane and hydrogen supplied to the opposite surface of the polymer electrolyte membrane, to an external load.

A cell stack may have a structure in which hundreds of cells are stacked. When the unit cells operate normally during operation of the cell stack, the unit cells may form a predetermined magnitude of voltage. If any one of hundreds of cells fails to exhibit normal performance, the total output of the cell stack is lowered. If the reverse voltage phenomenon continues, operation of the cell stack needs to be stopped. A cell-monitoring connector checks the state of each of the unit cells of the cell stack and continuously monitors the voltage of the unit cells. To this end, the cell-monitoring connector may be electrically connected to the cells in order to check the voltage of each of the unit cells constituting the cell stack. Studies on various structures for electrical connection between the cell-monitoring connector and the cell stack have been conducted.

Korean Patent Registration No. 10-1337937, registered on Dec. 2, 2013, and entitled "CONNECTOR FOR MEASURING CELL VOLTAGE OF FUEL CELL STACK", may describe information related to the subject matter of the present disclosure.

SUMMARY

Accordingly, embodiments are directed to a cell-monitoring connector for a fuel cell that substantially obviates one or more problems due to limitations and disadvantages of the related art.

Embodiments provide a cell-monitoring connector for a fuel cell, which has excellent assemblability.

However, features accomplishable by the embodiments are not limited to the above-mentioned features, and other features not mentioned herein will be clearly understood by those skilled in the art from the following description.

A cell-monitoring connector for a fuel cell according to an embodiment, which is mounted to a plurality of unit cells stacked in a first direction, may include a housing configured to be coupled to a plurality of terminals protruding from side portions of separators included in each of the plurality of unit cells toward the cell-monitoring connector in a second direction, which intersects the first direction, and a connector and terminal position assurance (CTPA) configured to be detachably coupled to the housing. The CTPA may include a connector position assurance (CPA) configured to be locked in a groove portion, formed by receiving recesses formed in the plurality of terminals overlapping each other in the first direction, to secure the housing to the plurality of terminals, a terminal position assurance (TPA) configured to be detachably coupled to the front surface of the housing and to allow connection terminals to be press-fitted into the housing, and a connecting portion interconnecting the CPA and the TPA.

In an example, the CPA, the TPA, and the connecting portion may be integrally formed with each other.

In an example, the housing may include a body configured to be coupled to the plurality of terminals, a first upper portion extending from the upper side of the body in a third direction, the third direction being a direction intersecting the first direction and the second direction, and having a first insertion opening formed therethrough in the second direction, and a first lower portion extending from the lower side of the body, which is opposite the upper side of the body, in the third direction and having a second insertion opening formed therethrough in the second direction.

In an example, the CPA may include a first CPA configured to be detachably coupled to the first upper portion in the second direction through the first insertion opening and to be locked in the groove portion formed by the receiving recesses formed in the upper portions of the plurality of terminals overlapping each other in the first direction and a second CPA configured to be detachably coupled to the first lower portion in the second direction through the second insertion opening and to be locked in the groove portion formed by the receiving recesses formed in the lower portions of the plurality of terminals overlapping each other in the first direction.

In an example, the TPA may include a main body configured to allow the connection terminals to be inserted thereinto, a second upper portion bent and extending from the upper side of the main body in the second direction, and a second lower portion bent and extending from the lower side of the main body in the second direction.

In an example, the housing may include a first protruding portion protruding from the upper side of the body in the third direction, a second protruding portion bent and protruding from an end portion of the first protruding portion toward the connecting portion in the second direction, a third protruding portion protruding from the lower side of the body in the third direction, and a fourth protruding portion bent and protruding from an end portion of the third protruding portion toward the connecting portion in the second direction.

In an example, the second upper portion of the TPA may have an end portion received in a first concave portion defined by the upper side of the body, the first protruding portion, and the second protruding portion. The second lower portion of the TPA may have an end portion received in a second concave portion defined by the lower side of the body, the third protruding portion, and the fourth protruding portion.

In an example, at least one of the second upper portion or the second lower portion may include a central portion having a cavity formed therethrough in the third direction and peripheral portions connected to the connecting portion and disposed on both sides of the central portion in the first direction.

In an example, the housing may include a plurality of protrusions protruding from the body toward the cavity in the third direction and disposed so as to be spaced apart from each other in the second direction.

In an example, each of the plurality of protrusions may include a first slanted surface oriented toward the rear surface of the housing, rather than the front surface of the housing, and a second slanted surface oriented toward the front surface of the housing, rather than the rear surface of the housing, and located opposite the first slanted surface. The second slanted surface may have an inclination less than the inclination of the first slanted surface, and the second upper portion or the second lower portion may have an end portion slanted corresponding to the second slanted surface.

In an example, the connecting portion may include a first connecting portion interconnecting the second upper portion and the first CPA and a second connecting portion interconnecting the second lower portion and the second CPA.

In an example, each of the first CPA and the second CPA may include a lever supported by the connecting portion, a locking protrusion disposed on one of two opposite end portions of the lever to be locked in the groove portion, and a push portion disposed on the other of the two opposite end portions of the lever.

In an example, the locking protrusion, the push portion, and the lever of the first CPA may have sectional shapes symmetrical with the sectional shapes of the locking protrusion, the push portion, and the lever of the second CPA in the third direction.

In an example, the push portion may include a plurality of stepped surfaces having a height difference therebetween in the third direction.

In an example, the first CPA may include a $1\text{-}1^{st}$ portion in which the locking protrusion is located, a $1\text{-}2^{nd}$ portion connected to the first connecting portion, a $1\text{-}3^{rd}$ portion located in the first insertion opening, a $1\text{-}4^{th}$ portion interconnecting the $1\text{-}1^{st}$ portion and the $1\text{-}2^{nd}$ portion and overlapping the upper side of the body in the third direction, a $1\text{-}5^{th}$ portion interconnecting the $1\text{-}2^{nd}$ portion and the $1\text{-}3^{rd}$ portion and overlapping the upper side of the body in the third direction, and a $1\text{-}6^{th}$ portion in which at least part of the push portion is located. The second CPA may include a $2\text{-}1^{st}$ portion in which the locking protrusion is located, a $2\text{-}2^{nd}$ portion connected to the second connecting portion, a $2\text{-}3^{rd}$ portion located in the second insertion opening, a 2-4th portion interconnecting the $2\text{-}1^{st}$ portion and the $2\text{-}2^{nd}$ portion and overlapping the lower side of the body in the third direction, a $2\text{-}5^{th}$ portion interconnecting the $2\text{-}2^{nd}$ portion and the $2\text{-}3^{rd}$ portion and overlapping the lower side of the body in the third direction, and a $2\text{-}6^{th}$ portion in which at least part of the push portion is located.

In an example, the $1\text{-}1^{st}$ portion and the $2\text{-}1^{st}$ portion may overlap each other in the third direction, and the $1\text{-}6^{th}$ portion and the $2\text{-}6^{th}$ portion may overlap each other in the third direction.

In an example, the TPA may further include a first guide bar disposed on the second upper portion and having a side surface stepped with respect to the side surface of the second upper portion, and the first upper portion of the housing may include an upper inner side surface formed corresponding to the first guide bar to guide insertion of the CTPA in the second direction.

In an example, the first guide bar may overlap at least one of the $1\text{-}3^{rd}$ portion, the $1\text{-}5^{th}$ portion, or the $1\text{-}6^{th}$ portion in the third direction.

In an example, the TPA may further include a second guide bar disposed on the second lower portion and having a side surface stepped with respect to the side surface of the second lower portion, and the first lower portion of the housing may include a lower inner side surface formed corresponding to the second guide bar to guide insertion of the CTPA in the second direction.

In an example, the second guide bar may overlap at least one of the $2\text{-}3^{rd}$ portion, the $2\text{-}5^{th}$ portion, or the $2\text{-}6^{th}$ portion in the third direction.

BRIEF DESCRIPTION OF THE DRAWINGS

The accompanying drawings, which are included to provide a further understanding of embodiments of the invention and are incorporated in and constitute a part of this application, illustrate embodiments of the invention and together with the description serve to explain the principles of embodiments of the invention. In the drawings.

DETAILED DESCRIPTION OF ILLUSTRATIVE EMBODIMENTS

Figure 1:
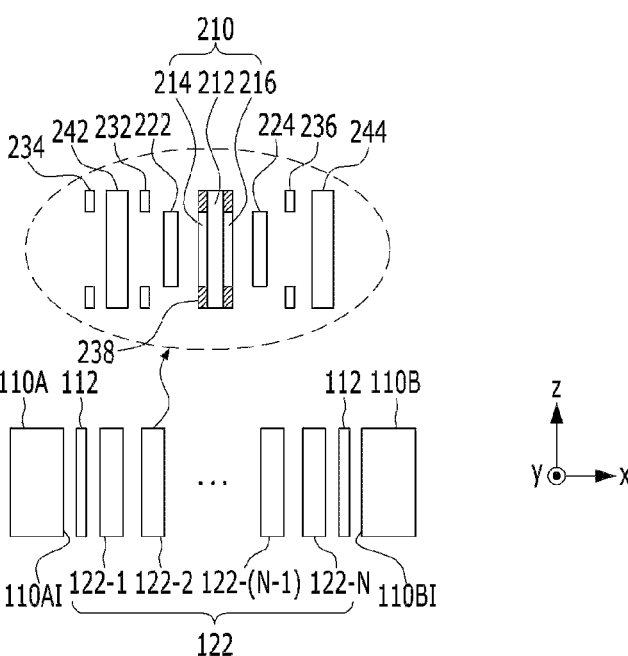
FIG. 1 is a cross-sectional view of end plates and a cell stack of a fuel cell.

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under," "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a cell-monitoring connector (or a fuel stack voltage monitor (FSVM)) 300 for a fuel cell according to an embodiment will be described with reference to the accompanying drawings. The cell-monitoring connector 300 for a fuel cell will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the embodiments are not limited thereto. That is, the x-axis, the y-axis, and the z-axis may intersect each other obliquely. In the following description, the x-axis direction will be referred to as a "first direction," the y-axis direction will be referred to as a "second direction," and the z-axis direction will be referred to as a "third direction" for convenience of description. The first, second, and third directions may be perpendicular to each other or may intersect each other obliquely.

A fuel cell, to which the cell-monitoring connector 300 for a fuel cell according to the embodiment is connected, may be, for example, a polymer electrolyte membrane fuel cell (or a proton exchange membrane fuel cell) (PEMFC), which has been studied most extensively as a power source for driving vehicles. However, the embodiments are not limited to any specific type of fuel cell.

The fuel cell may include end plates (pressing plates or compression plates) (not shown) and a cell stack (not shown).

Hereinafter, an example of the fuel cell, to which the cell-monitoring connector 300 for a fuel cell according to the embodiment is detachably mounted, will be described with reference to FIG. 1. However, the cell-monitoring connector 300 for a fuel cell according to the embodiment may be applied without being limited as to the specific type of fuel cell.

FIG. 1 is a cross-sectional view of the end plates and the cell stack of the fuel cell.

The cell stack 122 may include a plurality of unit cells 122-1 to 122-N, which are stacked in the first direction. Here, "N" is a positive integer of 1 or greater and may range from several tens to several hundreds. However, the embodiments are not limited to any specific value of "N."

Each unit cell 122-$n$ may generate electric power having a predetermined voltage. Here, 1≤n≤N. "N" may be determined depending on the intensity of the power to be supplied from the fuel cell to a load. Here, the load refers to a part of a vehicle that requires power when the fuel cell is used in the vehicle.

Each unit cell 122-$n$ may include a membrane electrode assembly (MEA) 210, gas diffusion layers (GDLs) 222 and 224, gaskets 232, 234, and 236, and separators (or bipolar plates) 242 and 244.

The membrane electrode assembly 210 has a structure in which catalyst electrode layers, in which electrochemical reaction occurs, are attached to both sides of an electrolyte membrane through which hydrogen ions move. Specifically, the membrane electrode assembly 210 may include a polymer electrolyte membrane (or a proton exchange membrane) 212, a fuel electrode (a hydrogen electrode or an anode) 214, and an air electrode (an oxygen electrode or a cathode) 216. In addition, the membrane electrode assembly 210 may further include a sub-gasket 238.

The polymer electrolyte membrane 212 is disposed between the fuel electrode 214 and the air electrode 216.

Hydrogen, which is the fuel in the fuel cell, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. Only the hydrogen ions may be selectively transferred to the air electrode 216 through the polymer electrolyte membrane 212, and at the same time, the electrons may be transferred to the air electrode 216 through the separators 242 and 244, which are conductors. In order to realize the above operation, a catalyst layer may be applied to each of the fuel electrode 214 and the air electrode 216. The movement of the electrons described above causes the electrons to flow through an external wire, thus generating current. That is, the fuel cell may generate power due to the electrochemical reaction between hydrogen, which is fuel, and oxygen contained in the air.

In the air electrode 216, the hydrogen ions supplied through the polymer electrolyte membrane 212 and the electrons transferred through the separators 242 and 244 meet oxygen in the air supplied to the air electrode 216, thus causing a reaction that generates water ("condensed water" or "product water").

In some cases, the fuel electrode 214 may be referred to as an anode, and the air electrode 216 may be referred to as a cathode. Alternatively, the fuel electrode 214 may be referred to as a cathode, and the air electrode 216 may be referred to as an anode.

The gas diffusion layers 222 and 224 serve to uniformly distribute hydrogen and oxygen, which are reaction gases, and to transfer the generated electric energy. To this end, the gas diffusion layers 222 and 224 may be disposed on respective sides of the membrane electrode assembly 210. That is, the first gas diffusion layer 222 may be disposed on the left side of the fuel electrode 214, and the second gas diffusion layer 224 may be disposed on the right side of the air electrode 216.

The first gas diffusion layer 222 may serve to diffuse and uniformly distribute hydrogen supplied as a reactant gas through the first separator 242 and may be electrically conductive. The second gas diffusion layer 224 may serve to diffuse and uniformly distribute air supplied as a reactant gas through the second separator 244 and may be electrically conductive.

Each of the first and second gas diffusion layers 222 and 224 may be a microporous layer in which fine carbon fibers are combined. However, the embodiments are not limited to any specific configuration of the first and second gas diffusion layers 222 and 224.

The gaskets 232, 234, and 236 may serve to maintain airtightness and clamping pressure of the cell stack at an appropriate level with respect to the reactant gases and the coolant, to disperse the stress when the separators 242 and 244 are stacked, and to independently seal the flow paths. As such, since airtightness and watertightness are maintained by the gaskets 232, 234, and 236, the flatness of the surfaces that are adjacent to the cell stack 122, which generates power, may be secured, and thus surface pressure may be distributed uniformly over the reaction surface of the cell stack 122. To this end, the gaskets 232, 234, and 236 may be formed of rubber. However, the embodiments are not limited to any specific material of the gaskets.

The separators 242 and 244 may serve to move the reactant gases and the cooling medium and to separate each of the unit cells from the other unit cells. In addition, the separators 242 and 244 may serve to structurally support the membrane electrode assembly 210 and the gas diffusion layers 222 and 224 and to collect the generated current and transfer the collected current to current collectors 112.

The separators 242 and 244 may be disposed outside the gas diffusion layers 222 and 224, respectively. That is, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. The second separator 244 serves to supply air as a reactant gas to the air electrode 216 through the second gas diffusion layer 224. In addition, each of the first and second separators 242 and 244 may form a channel through which a cooling medium (e.g., coolant) may flow. Further, the separators 242 and 244 may be formed of a graphite-based material, a composite graphite-based material, or a metal-based material. However, the embodiments are not limited to any specific material of the separators 242 and 244.

The end plates 110A and 110B shown in FIG. 1 may be disposed at the respective ends of the cell stack 122 and may support and fix the unit cells. That is, the first end plate 110A may be disposed at one end of the cell stack 122, and the second end plate 110B may be disposed at the opposite end of the cell stack 122.

Each of the end plates 110A and 110B may be configured such that a metal insert is surrounded by a plastic injection-molded product. The metal insert of each of the end plates 110A and 110B may have high rigidity to withstand internal surface pressure and may be formed by machining a metal material. For example, each of the end plates 110A and 110B may be formed by combining a plurality of plates. However, the embodiments are not limited to any specific configuration of the end plates 110A and 110B.

The current collectors 112 may be disposed between the cell stack 122 and the inner surfaces 110AI and 110BI of the end plates 110A and 110B that face the cell stack 122. The current collectors 112 serve to collect the electric energy generated by the flow of electrons in the cell stack 122 and to supply the electric energy to a load that uses the fuel cell.

Further, the first end plate 110A may include a plurality of manifolds (or communicating portions) M. Each of the first and second separators 242 and 244 shown in FIG. 1 may include manifolds that are formed in the same shape at the same positions as the manifolds of the first end plate 110A. Here, the manifolds may include an inlet manifold and an outlet manifold. Hydrogen and oxygen, which are reactant gases necessary in the membrane electrode assembly 210, may be introduced from the outside into the cell stack 122 through the inlet manifold. Gas or liquid, in which the reactant gases humidified and supplied to the cell and the condensed water generated in the cell are combined, may be discharged to the outside of the fuel cell through the outlet manifold. The cooling medium may flow from the outside into the cell stack 122 through the inlet manifold and may flow from the cell stack 122 to the outside through the outlet manifold. As described above, the manifolds allow the fluid to flow into and out of the membrane electrode assembly 210.

In order to determine the performance and failure of the cell stack 122, the separators 242 and 244 of each cell may be connected to a control circuit via a cell-monitoring connector 300 and a wire so as to measure the voltage of each cell. Here, the control circuit refers to a circuit including a measurement device and an electronic control unit for operating the fuel cell in a vehicle.

Hereinafter, a cell-monitoring connector 300 for a fuel cell (hereinafter referred to as a "cell-monitoring connector") according to an embodiment, which checks the state (e.g., voltage) of each of the unit cells included in the fuel cell, will be described with reference to the accompanying drawings.

Figure 2:
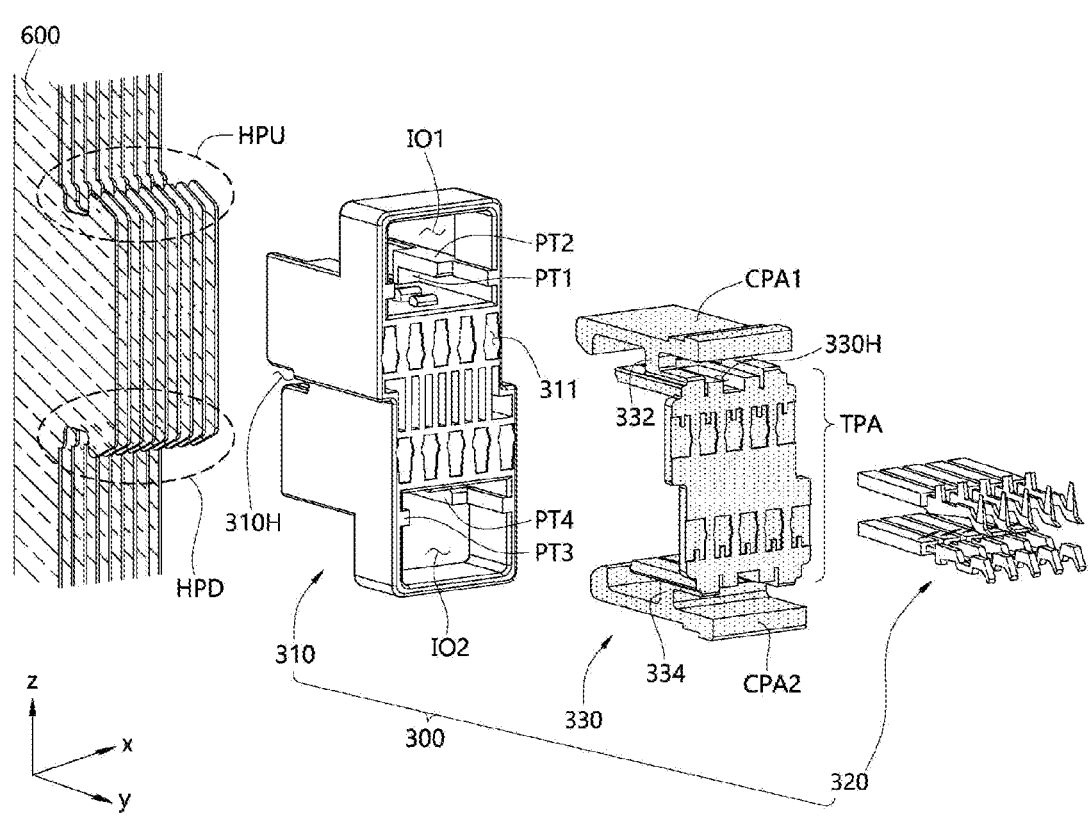
FIG. 2 is a front exploded perspective view of a cell-monitoring connector and separators of a fuel cell according to an embodiment when viewed from the right.
Figure 3:
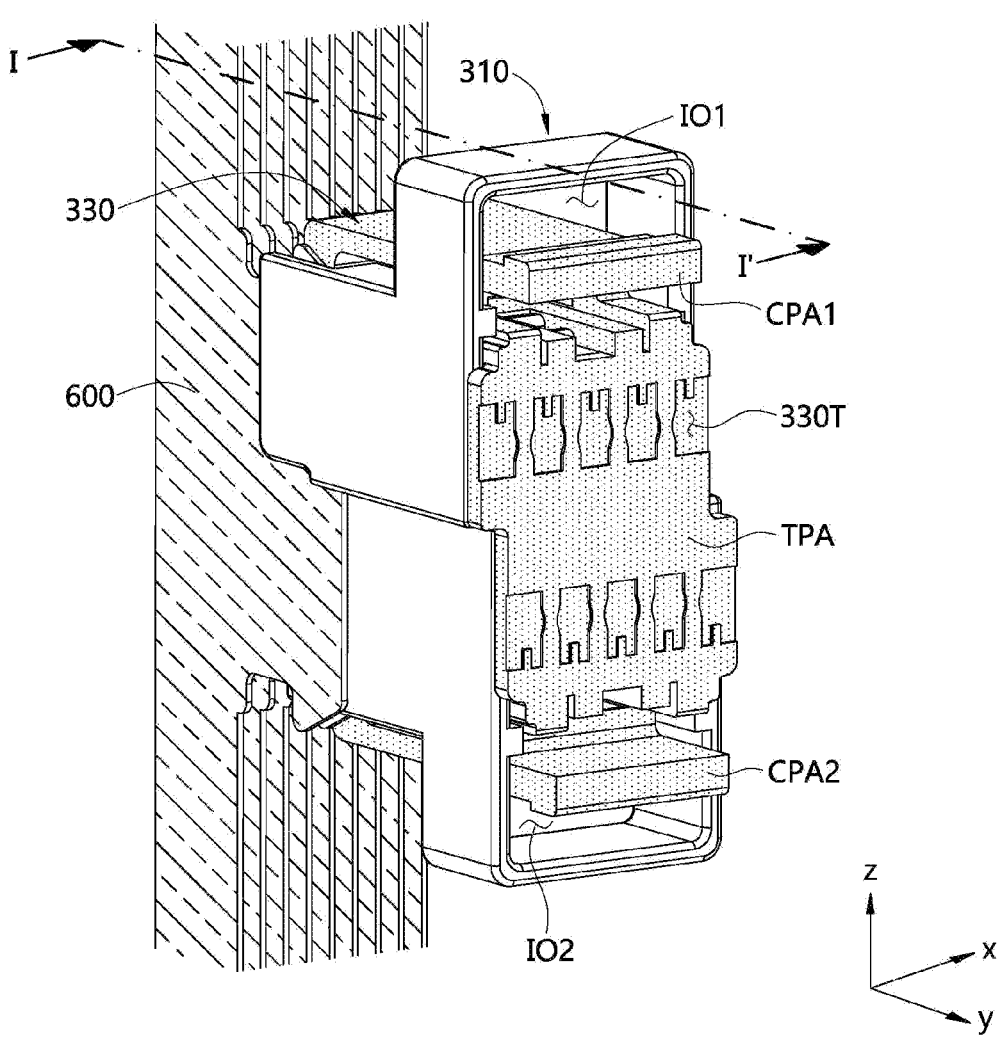
FIG. 3 is a front coupled perspective view showing the state in which the cell-monitoring connector according to an embodiment is coupled to the separators.
Figure 4:
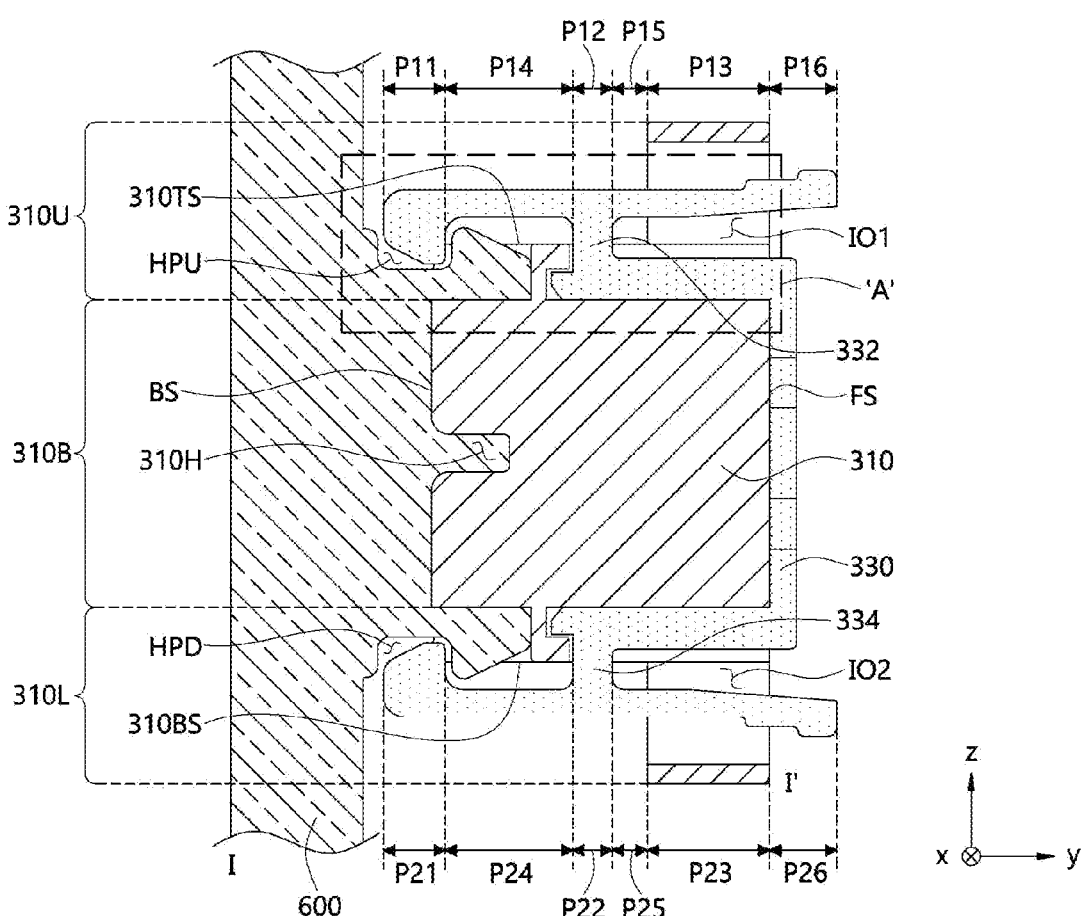
FIG. 4 is a cross-sectional view taken along line I-I' in FIG. 3.
Figure 5A:
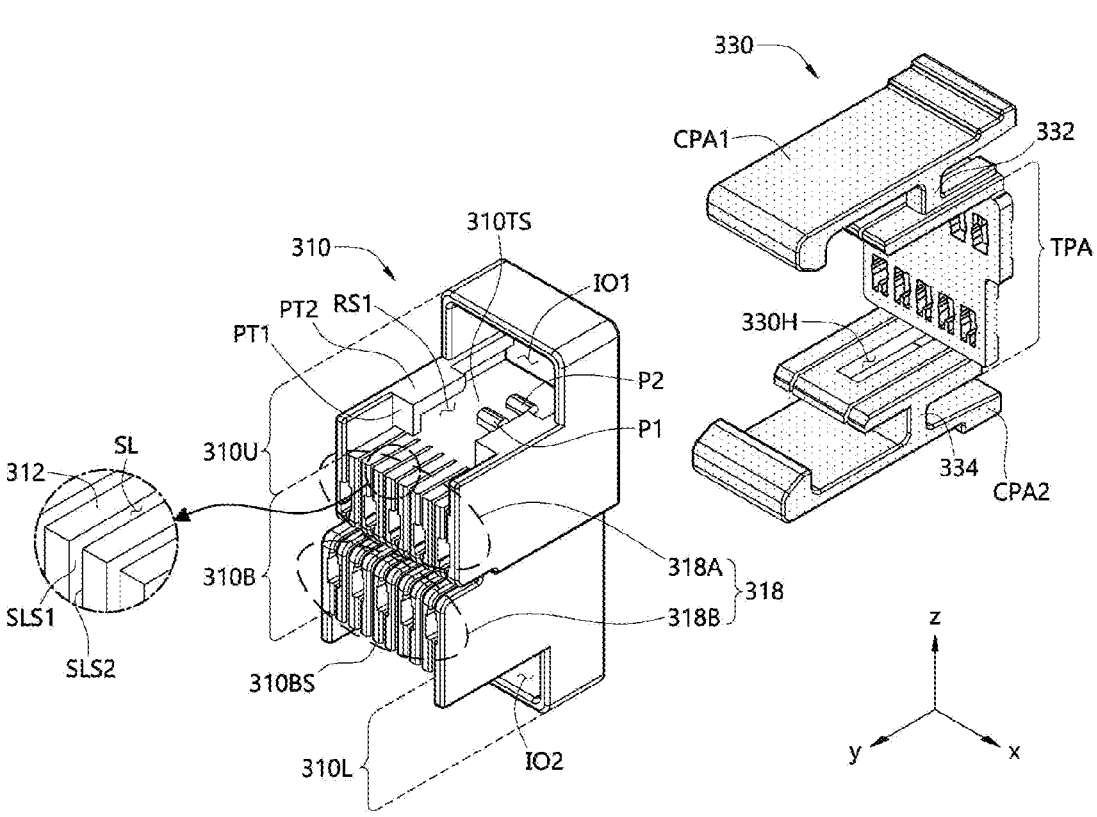
FIG. 5A is a rear exploded perspective view of the cell-monitoring connector shown in FIG. 2.
Figure 5B:
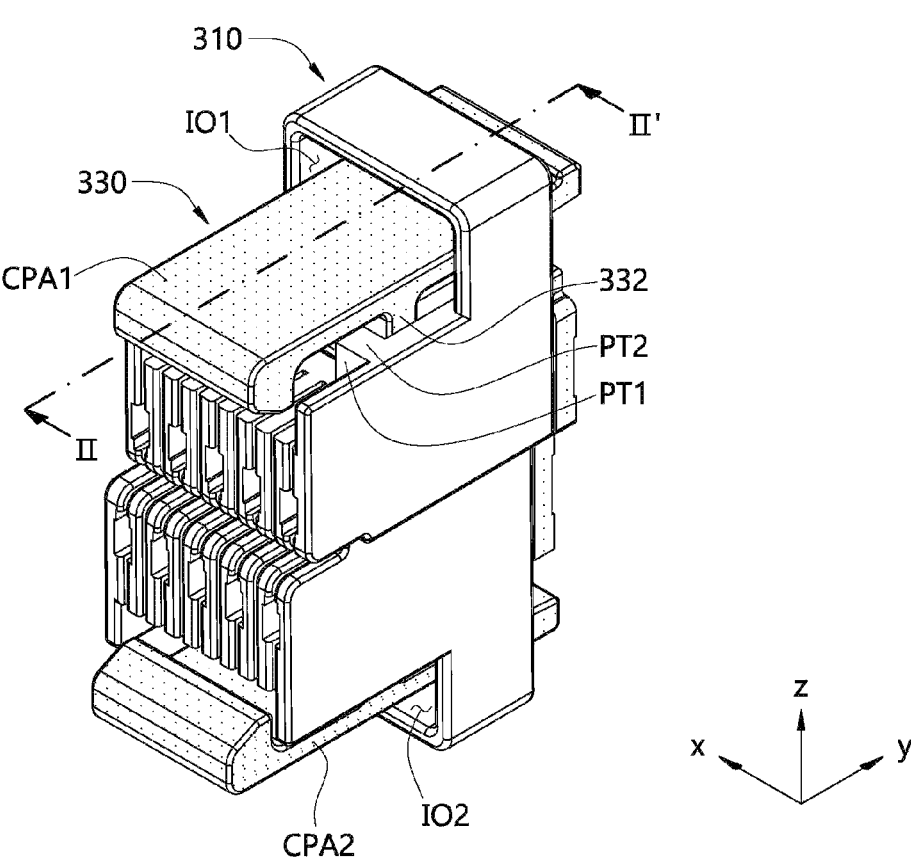
FIG. 5B is a rear coupled perspective view of the cell-monitoring connector shown in FIG. 5A.
Figure 5B:
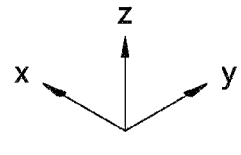
Figure 6:
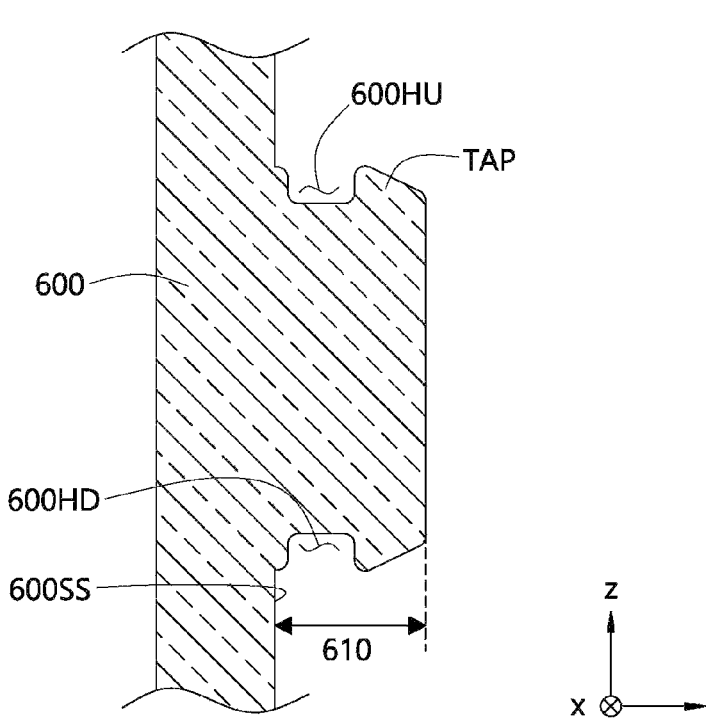
FIG. 6 is a side view of the separators shown in FIGS. 2 to 4.

FIG. 2 is a front exploded perspective view of the cell-monitoring connector 300 and separators 600 of a fuel cell according to an embodiment when viewed from the right, FIG. 3 is a front coupled perspective view showing the state in which the cell-monitoring connector 300 according to the embodiment is coupled to the separators 600, FIG. 4 is a cross-sectional view taken along line I-I' in FIG. 3, FIG. 5A is a rear exploded perspective view of the cell-monitoring connector 300 shown in FIG. 2, FIG. 5B is a rear coupled perspective view of the cell-monitoring connector 300 shown in FIG. 5A, FIG. 6 is a side view of the separators 600 shown in FIGS. 2 to 4, and FIG. 7 is a side view of an embodiment 330A of a connector and terminal position assurance (hereinafter referred to as a "CTPA") 330 according to the embodiment shown in FIGS. 2 to 5B.

For better understanding, illustration of the connection terminals 320 shown in FIG. 2 is omitted from FIGS. 3 to 5B. For convenience of description, among the components of the fuel cell, to which the cell-monitoring connector 300 according to the embodiment is mounted, only the separators 600 are illustrated. The separators 600, to which the cell-monitoring connector 300 according to the embodiment is connected, are merely given by way of example to aid in understanding the cell-monitoring connector 300 and may have any of various shapes. Further, components of the fuel cell other than the separators 600 may also be formed in any of various shapes, and the embodiments are not limited to any specific shapes of the components of the fuel cell. In addition, although not illustrated, gaskets may be disposed on the separators.

The separators 600 may correspond to the separators 242 and 244 shown in FIG. 1, and the gaskets may correspond to the gaskets 232, 234, and 236 shown in FIG. 1. Alternatively, the gaskets may be separate gaskets diverging from the gaskets 232, 234, and 236 shown in FIG. 1.

As the unit cells 122-1 to 122-N are stacked in the first direction, the separators 600 may be disposed so as to be spaced apart from each other in the first direction, as shown in FIGS. 2 to 4.

As shown in FIG. 6, each of the separators 600 may include a terminal 610 protruding from a side portion 600SS thereof in the second direction. Here, the second direction may be a direction in which the side portion 600SS of the separator 600 faces the cell-monitoring connector 300. The cell-monitoring connector 300 may be coupled to a tab TAB formed at an end portion of the terminal 610.

The separators 600 included in the cell stack 122 may correspond to some of all separators included in the fuel cell. For example, all separators included in the fuel cell may be grouped into unit groups, and each unit group may include a plurality of separators 600. The cell-monitoring connectors 300 may be mounted to the separators belonging to respective unit groups. The cell-monitoring connectors 300 may have the same configuration and may perform the same operation as each other. For example, each unit group may include ten separators 600, as illustrated in FIG. 2, and the cell-monitoring connector 300 shown in FIG. 2 may be mounted to each of the unit groups of the fuel cell.

A recess (hereinafter referred to as a "receiving recess") may be formed in at least one of the upper portion or the lower portion of the terminal 610 included in each of the separators 600. For example, as illustrated in FIG. 6, a receiving recess 600HU (hereinafter referred to as an "upper receiving recess") may be formed in the upper portion of the terminal 610 of each of the separators 600, and a receiving recess 600HD (hereinafter referred to as a "lower receiving recess") may be formed in the lower portion of the terminal 610 of each of the separators 600, but the embodiments are not limited thereto. Hereinafter, the configuration in which both the upper receiving recess 600HU and the lower receiving recess 600HD are formed in the terminal 610 will be described. However, the embodiments are not limited thereto.

According to another embodiment, the receiving recess 600HU or 600HD may be formed only in one of the upper portion and the lower portion of the terminal 61_o_, and the following description may also be applied to this embodiment.

The upper and lower receiving recesses 600HU and 600HD formed in each of the separators 600 belonging to the unit group may be disposed so as to overlap the upper and lower receiving recesses 600HU and 600HD formed in an adjacent separator 600 in the first direction.

The upper receiving recesses 600HU overlapping each other in the first direction may form a groove portion (hereinafter referred to as an "upper groove portion"), and the lower receiving recesses 600HD overlapping each other in the first direction may form a groove portion (hereinafter referred to as a "lower groove portion"). The cell-monitoring connector 300 may be mounted in the upper groove portion and the lower groove portion.

For example, referring to FIG. 2, the upper receiving recesses 600HU overlapping each other in the first direction may define an upper groove portion HPU, which is a receiving space in which the cell-monitoring connector 300 is mounted, and the lower receiving recesses 600HD overlapping each other in the first direction may define a lower groove portion HPD, which is a receiving space in which the cell-monitoring connector 300 is mounted. That is, the upper groove portion HPU may be formed by arrangement of the upper receiving recesses 600HU formed in the upper portions of the terminals 610, and the lower groove portion HPD may be formed by arrangement of the lower receiving recesses 600HD formed in the lower portions of the terminals 610.

Meanwhile, the cell-monitoring connector 300 according to the embodiment may be configured so as to be detachably mounted to the fuel cell. To this end, the cell-monitoring connector 300 may include a housing 310, connection terminals 320, and a CTPA 330. In this case, the cell-monitoring connector 300 according to the embodiment is not limited to any specific shape of the connection terminal 320.

The housing 310, which is a main body of the cell-monitoring connector 300, may be coupled to the terminals 610 of the separators 600 and may serve to accommodate the CTPA 330.

Referring to FIG. 5A, the housing 310 may include first and second slit portions 318 (318A and 318B) formed in the rear surface BS thereof. Each of the first and second slit portions 318 (318A and 318B) may include a plurality of slits SL. Each of the slits SL corresponds to a depressed portion between two surfaces SLS1 and SLS2 facing each other. Although not shown, the housing 310 may include partition walls (not shown), and each of the slits SL may be located in a space between adjacent ones of the partition walls. The cell-monitoring connector 300 for a fuel cell according to the embodiment is not limited to any specific shape of the slit SL.

Locking protrusions 412 of the CTPA 330, which will be described later, may be locked in the upper groove portion HPU and the lower groove portion HPD in the separators 600, and the terminals 610 of the separators 600 may be fitted into the respective slits SL of the slit portions 318A and 318B.

In addition, referring to FIG. 2, the housing 310 may include connection terminal insertion holes 311 formed in the front surface FS thereof. The connection terminal insertion holes 311 may communicate with the slits SL formed in the rear surface BS of the housing 310.

In addition, the housing 310 may include a shift-preventing groove 310H disposed between the first and second slit portions 318A and 318B. If the shift-preventing groove 310H is omitted, although not shown, the first and second slit portions 318A and 318B may be formed separately from each other in the third direction. One of the first and second slit portions 318A and 318B may include slits SL into which the terminals 610 of the odd-numbered (or even-numbered) separators among the plurality of separators 600 are fitted, and the other of the first and second slit portions 318A and 318B may include slits SL into which the terminals 610 of the even-numbered (or odd-numbered) separators among the plurality of separators 600 are fitted. As such, when adjacent ones of the separators 600 are alternately fitted into the slits SL of the two different slit portions 318A and 318B, the sizes of gaps in the first direction between adjacent ones of the separators 600 may be reduced.

In general, each of the separators 600 that are adjacent to each other is electrically conductive. The partition walls, which are electrically insulative, serve to electrically isolate the terminals 610 of the separators 600, which are fitted into the respective slits SL, from each other, thereby preventing the occurrence of short-circuit between adjacent ones of the separators 600.

Further, when the partition walls have the same thickness as each other in the first direction and the slits SL have the same width as each other in the first direction, the separators 600 may be arranged at regular intervals in the first direction, and accordingly, stacking tolerances of the separators 600 in the first direction may be compensated. As such, since the separators 600 included in the cell stack 122 are accurately aligned, the upper and lower receiving recesses 600HU and 600HD, which form the upper and lower groove portions HPU and HPD, may be prevented from being misaligned, thereby making it possible to easily assemble the cell-monitoring connector 300 to the separators 600.

In addition, referring to FIG. 5A, the housing 310 may include a body 310B, a first upper portion 310U, and a first lower portion 310L.

The body 310B is a portion that is coupled to the terminals 610 of the separators 600.

The first upper portion 310U may extend from the upper side 310TS of the body 310B in the third direction and may include a first insertion opening 101 formed therethrough in the second direction.

The first lower portion 310L may extend from the lower side 310BS of the body 310B, which is opposite the upper side 310TS of the body 310B, in the third direction, and may include a second insertion opening IO2 formed therethrough in the second direction.

Meanwhile, according to an embodiment, the CTPA 330 may be detachably coupled to the housing 310.

The CTPA 330 may include connector position assurances (CPAs) CPA1 and CPA2, connecting portions 332 and 334, and a terminal position assurance (hereinafter referred to as a "TPA").

The CPAs CPA1 and CPA2 serve to secure the housing 310 to the terminals 610 after the housing 310 of the cell-monitoring connector 300 is coupled to the separators 600. To this end, the CPAs may include a first CPA CPA1 and a second CPA CPA2.

The first CPA CPA1 may be coupled to or removed from the first upper portion 310U through the first insertion opening 101 in the housing 310 in the second direction and may be locked in the upper groove portion HPU, as shown in FIG. 4.

The second CPA CPA2 may be coupled to or removed from the first lower portion 310L through the second insertion opening IO2 in the housing 310 in the second direction and may be locked in the lower groove portion HPD, as shown in FIG. 4.

In this way, since the first CPA CPA1 and the second CPA CPA2 are respectively locked in the upper groove portion HPU and the lower groove portion HPD, the housing 310 may be secured to the separators 600, thereby preventing the cell-monitoring connector 300 from being separated from the separators 600 in the second direction due to external vibration or impact. As described above, each of the first CPA CPA1 and the second CPA CPA2 is a kind of locking device and may be made of plastic.

Each of the first CPA CPA1 and the second CPA CPA2 may include a lever 410, a locking protrusion 412, and a push portion 414.

The lever 410 is a portion that is supported by each of the connecting portions 332 and 334 so as to be movable about each of the connecting portions 332 and 334 using the principle of leverage.

The locking protrusion 412 is a portion that is located at one of the two opposite end portions of the lever 410 so as to be locked in each of the groove portions HPU and HPD.

The push portion 414 is a portion that is located at the other of the two opposite end portions of the lever 410. For example, the upper surface of the push portion 414 may have an appropriate area and shape that enable a worker to press the same without using a tool.

Figure 7:
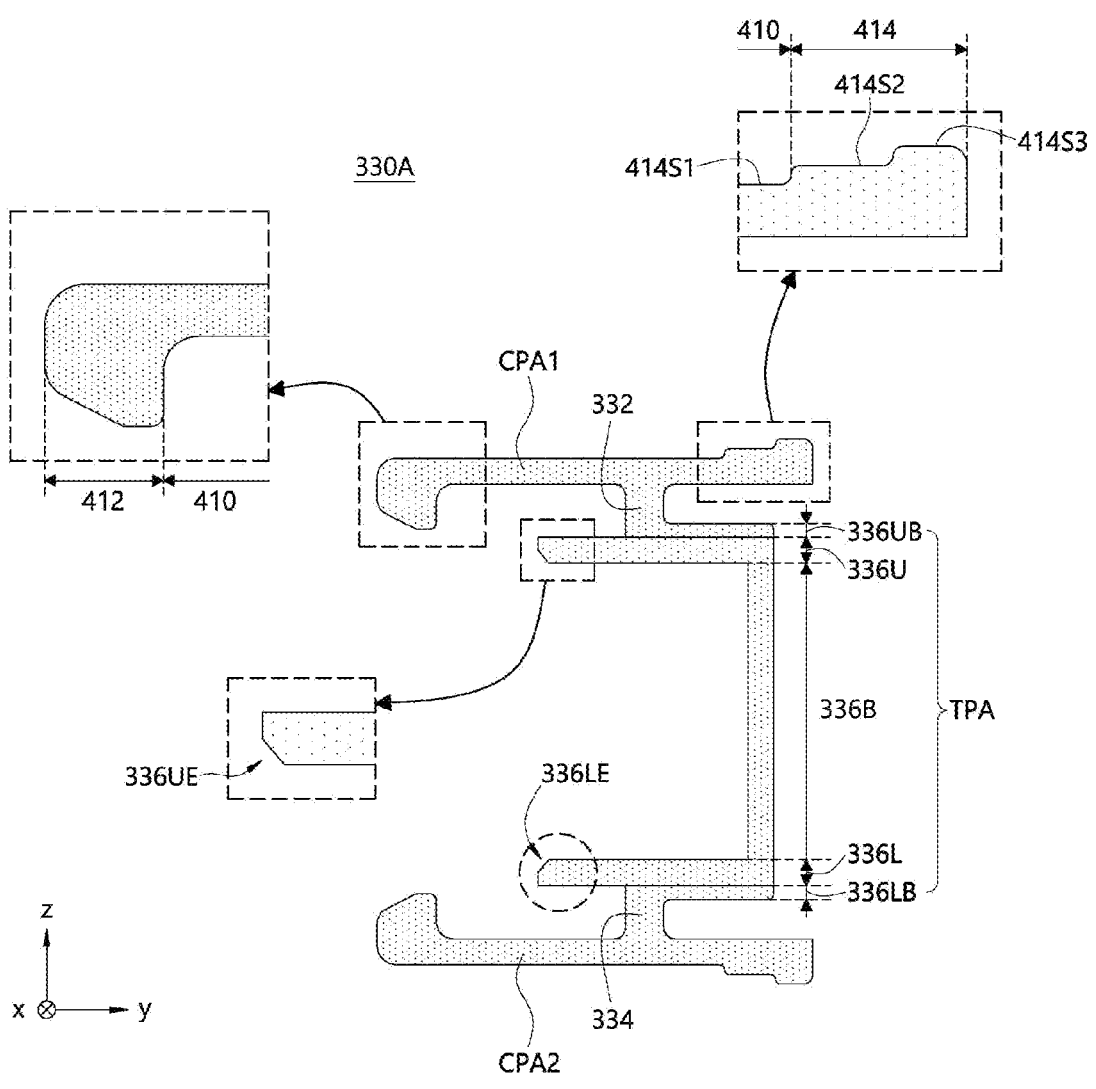
FIG. 7 is a side view of an embodiment of a connector and terminal position assurance (CTPA) according to the embodiment shown in FIGS. 2 to 5B.

As shown in FIG. 7, the locking protrusion 412, the push portion 414, and the lever 410 of the first CPA CPA1 may have sectional shapes symmetrical with the sectional shapes of the locking protrusion 412, the push portion 414, and the lever 410 of the second CPA CPA2 in the third direction.

As will be described later with reference to FIG. 13D, after the CTPA 330 is coupled to the housing 310, when the push portions 414 of the first CPA CPA1 and the second CPA CPA2 are pushed, the locking protrusions 412 are moved in directions opposite the directions in which the push portions 414 are pushed, and when the push portions 414 are not pushed, the locking protrusions 412 are moved and locked in the groove portions HPU and HPD. To this end, the levers 410 are supported by the connecting portions 332 and 334 so as to be movable about the connecting portions 332 and 334 using the principle of leverage.

In addition, according to an embodiment, in order to easily couple or remove the CTPA 330 to or from the housing 310, the push portion 414 may have a plurality of stepped surfaces 414S2 and 414S3, which have height differences from the upper surface 414S1 of the lever 410 in the third direction, or may have a slanted surface (not shown). Although the push portion 414 is illustrated in FIG. 7 as having two stepped surfaces 414S2 and 414S3, the embodiments are not limited to any specific number of stepped surfaces.

Since the push portion 414 has multiple stepped surfaces 414S2 and 414S3 or a slanted surface, it may be easier for a worker to manually handle the CTPA 330 in order to couple or remove the CTPA 330 to or from the separators 600.

If the push portion 414 is formed to be flat, rather than having the stepped surfaces 414S2 and 414S3, when the worker intends to remove the CTPA 330 from the separators 600, the CTPA 330 is highly likely to slip from the worker's hand, and thus it may be difficult for the worker to apply a sufficient amount of force to the CTPA 330. However, since the push portion 414 according to an embodiment has multiple stepped surfaces 414S2 and 414S3 or a slanted surface, it may be easy to insert the CTPA 330 into the housing 310 and then couple or remove the CTPA 330 to or from the separators 600, and unexpected release of the CTPA 330 may be prevented. Accordingly, assembly and disassembly of the cell-monitoring connector 300 may be efficiently performed.

In addition, referring to FIG. 4, the first CPA CPA1 may include 1-$1^{st}$ to 1-$6^{th}$ portions P11, P12, P13, P14, P15, and P16.

The 1-$1^{st}$ portion P11 is a portion in which the locking protrusion 412 is located. The 1-$2^{nd}$ portion P12 is a portion that is connected to the first connecting portion 332. The 1-$3^{rd}$ portion P13 is a portion that is located in the first insertion opening 101. The 1-$4^{th}$ portion P14 is a portion that interconnects the 1-$1^{st}$ portion P11 and the 1-$2^{nd}$ portion P12 and overlaps the upper side 310TS of the body 310B in the third direction. The 1-$5^{th}$ portion P15 is a portion that interconnects the 1-$2^{nd}$ portion P12 and the 1-$3^{rd}$ portion P13 and overlaps the upper side 310TS of the body 310B in the third direction. The 1-$6^{th}$ portion P16 is a portion in which at least part of the push portion 414 is located.

The second CPA CPA2 may include 2-$1^{st}$ to 2-$6^{th}$ portions P21, P22, P23, P24, P25, and P26.

The 2-$1^{st}$ portion P21 is a portion in which the locking protrusion 412 is located. The 2-$2^{nd}$ portion P22 is a portion that is connected to the second connecting portion 334. The 2-$3^{rd}$ portion P23 is a portion that is located in the second insertion opening IO2. The 2-$4^{th}$ portion P24 is a portion that interconnects the 2-$1^{st}$ portion P21 and the 2-$2^{nd}$ portion P22 and overlaps the lower side 310BS of the body 310B in the third direction. The 2-$5^{th}$ portion P25 is a portion that interconnects the 2-$2^{nd}$ portion P22 and the 2-$3^{rd}$ portion P23 and overlaps the lower side 310BS of the body 310B in the third direction. The 2-$6^{th}$ portion P26 is a portion in which at least part of the push portion 414 is located.

That is, referring to FIG. 4, the locking protrusion 412 of the first CPA CPA1 is inserted into and locked in the upper groove portion HPU in the third direction, and the locking protrusion 412 of the second CPA CPA2 is inserted into and locked in the lower groove portion HPD in the third direction, whereby the housing 310 may be secured to the separators 600.

Meanwhile, the TPA is detachably coupled to the front surface FS of the housing 310 and serves to cause the connection terminals 320 to be press-fitted into the housing 310, thereby ensuring reliable coupling of the connection terminals 320. That is, the TPA may increase the insertion force of the connection terminals 320, may prevent erroneous assembly by correctly positioning the connection terminals 320, and may make it possible to continuously sense the voltage value with high electrical reliability in spite of the narrow pitch between the separators 600.

The TPA may include a main body 336B, a second upper portion 336U, and a second lower portion 336L.

The main body 336B has through-holes 330T formed therein so as to allow the connection terminals 320 to be inserted thereinto and correspond to the connection terminal insertion holes 311 formed in the front surface FS of the housing 310.

The second upper portion 336U may be bent and extend from the upper side of the main body 336B in the second direction and may be disposed on the upper side 310TS of the body 310B of the housing 310. The second lower portion 336L may be bent and extend from the lower side of the main body 336B in the second direction, and may be disposed on the lower side 310BS of the body 310B of the housing 310.

According to one embodiment, the second upper portion 336U and the second lower portion 336L may be formed to be symmetrical with each other in the third direction. In this case, the upper groove portion HPU and the lower groove portion HPD in the separators 600 may also be formed to be symmetrical with each other in the third direction. In this case, the CTPA does not need an identifier for distinguishing the second upper portion 336U and the second lower portion 336L from each other.

According to another embodiment, the second upper portion 336U and the second lower portion 336L may be formed to be asymmetrical with each other in the third direction. In this case, the CTPA needs an identifier for distinguishing the second upper portion 336U and the second lower portion 336L from each other. Alternatively, the CTPA may need an identifier for distinguishing the first CPA CPA1 and the second CPA CPA2 from each other. For example, the identifier may be realized by coloring the first CPA CPA1 and the second CPA CPA2 in different colors. A worker may identify the first CPA CPA1 and the second CPA CPA2 using the identifier.

Figure 8A:
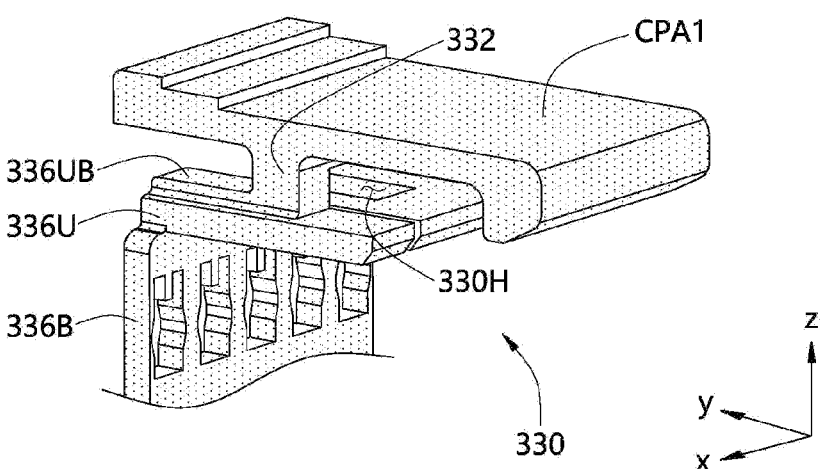
FIGS. 8A to 8D are views for explaining coupling of the CTPA to a housing.
Figure 8B:
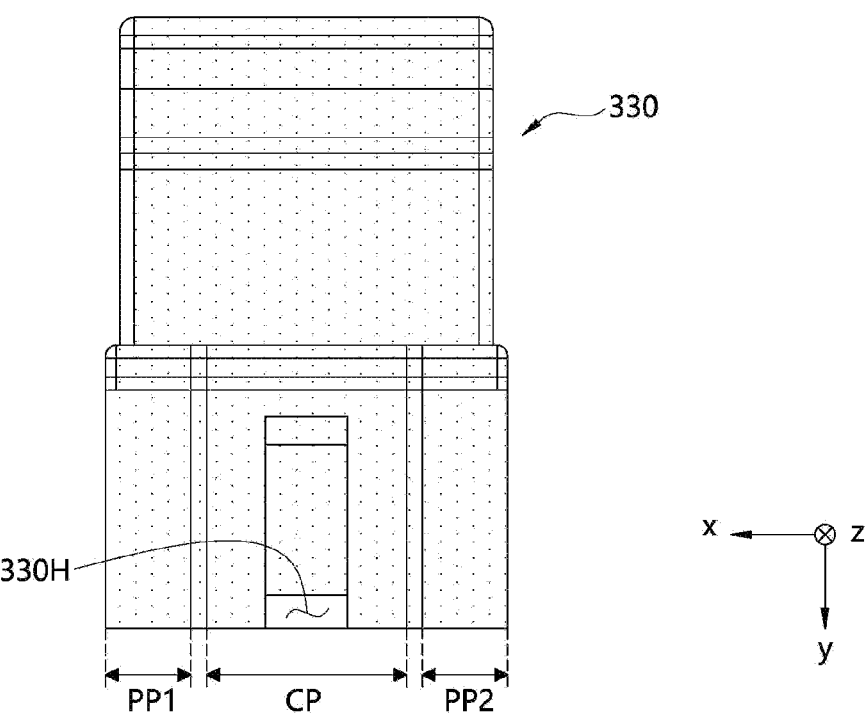
Figure 8C:
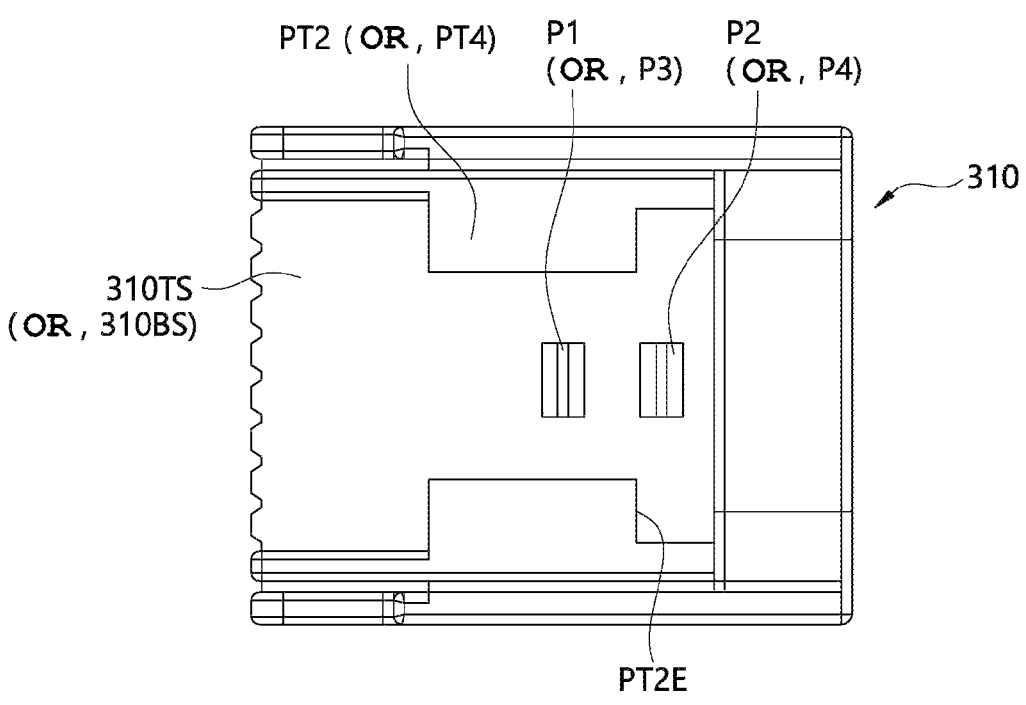
Figure 8C:
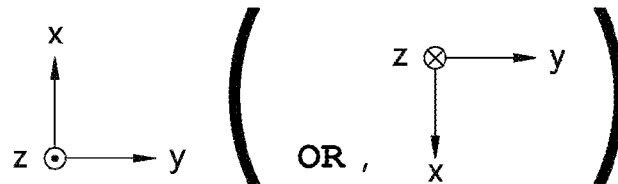
Figure 8D:
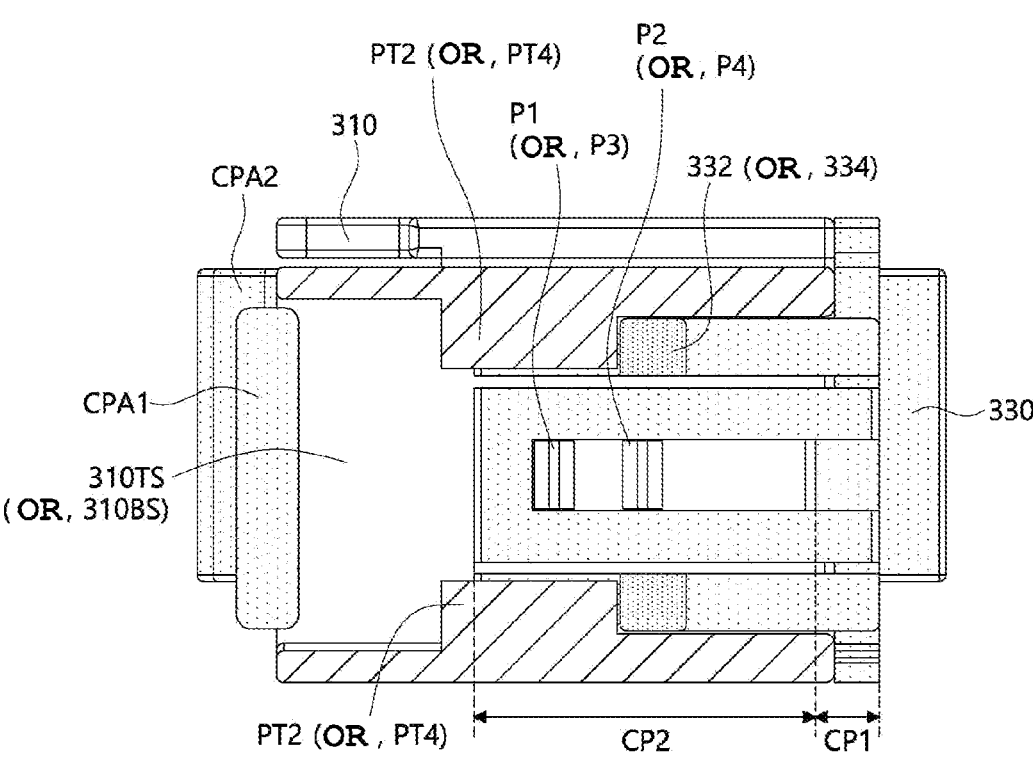
Figure 8D:
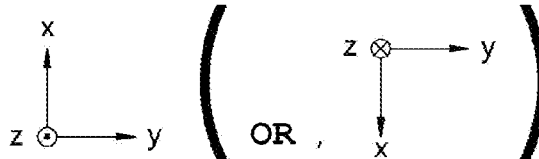

FIGS. 8A to 8D are views for explaining coupling of the CTPA 330 to the housing 310. FIG. 8A is a partial perspective view of the upper portion of the CTPA 330, FIG. 8B is a partial bottom view of the CTPA 330, FIG. 8C is a partial plan view of the housing 310, and FIG. 8D is a plan view of the cell-monitoring connector 300.

Referring to FIGS. 8A to 8D, at least one of the second upper portion 336U of the TPA according to the embodiment or the second lower portion 336L thereof may include a central portion CP and peripheral portions PP1 and PP2.

The central portion CP may have a cavity 330H formed therethrough in the third direction. As shown in FIG. 8D, the central portion CP may include a first portion CP1, which is a stationary portion, and a second portion CP2, which is a movable portion. When the CTPA 330 is inserted into the housing 310 in the second direction, the second portion CP2 of the central portion CP moves in the third direction in the state in which the first portion CP1 of the central portion CP is fixed, and the protrusions P1 and P2 shown in FIG. 8C are received in the cavity 330H, as shown in FIG. 8D. To this end, the central portion CP may be formed to be elastic.

The peripheral portions PP1 and PP2 are portions that are connected to the connecting portions 332 and 334. The peripheral portions PP1 and PP2 may be disposed on both sides of the central portion CP in the first direction.

The central portion CP is movable, whereas the peripheral portions PP1 and PP2 are stationary. Therefore, when the CTPA 330 is inserted into the housing 310 in the second direction, the central portion CP may move so that the protrusions P1 and P2 are received in the cavity 330H, but the peripheral portions PP1 and PP2 may be maintained in a fixed state without moving.

Figure 9A:
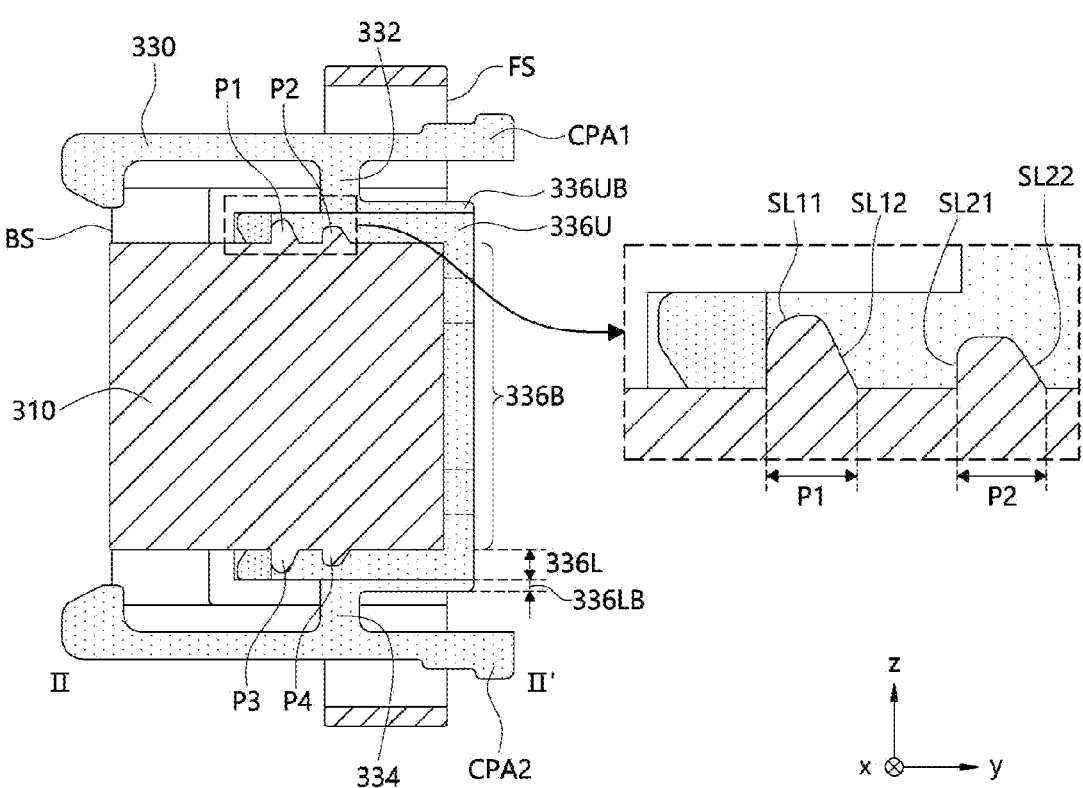
FIGS. 9A and 9B are, respectively, a cross-sectional view and a perspective view taken along line II-II' in FIG. 5B.

When the CTPA 330 is assembled to the housing 310, the TPA of the CTPA 330 may be aligned with the front surface FS of the housing 310 and moved forwards in the second direction, whereby the protrusions P1 and P2 may be locked in the cavity 330H in the second upper portion 336U of the TPA, and in a manner identical thereto, the protrusions P3 and P4 shown in FIG. 9A may be locked in the cavity 330H in the second lower portion 336L of the TPA.

Figure 9B:
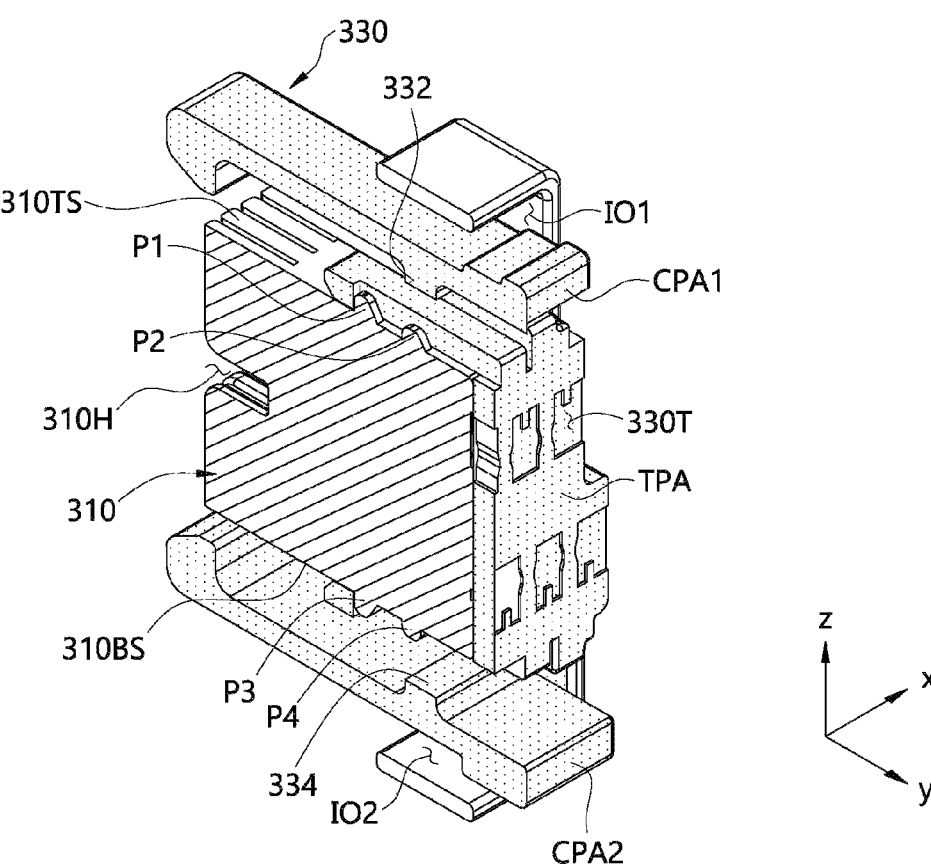

FIGS. 9A and 9B are, respectively, a cross-sectional view and a perspective view taken along line II-II' in FIG. 5B.

The protrusions P1 and P2 shown in FIG. 9A may correspond to embodiments of the protrusions P1 and P2 shown in FIGS. 8C and 8D.

The housing 310 may include a plurality of protrusions P1, P2, P3, and P4. The protrusions P1 and P2 may protrude from the upper side 310TS of the body 310B toward the cavity 330H in the third direction and may be disposed so as to be spaced apart from each other in the second direction. The protrusions P3 and P4 may protrude from the lower side 310BS of the body 310B toward the cavity 330H in the third direction and may be disposed so as to be spaced apart from each other in the second direction. Although the number of protrusions illustrated in FIGS. 8C, 8D, 9A, and 9B is four, the embodiments are not limited to any specific number of protrusions.

Each of the protrusions P1, P2, P3, and P4 may include a first slanted surface and a second slanted surface. Hereinafter, only the protrusions P1 and P2 will be described for convenience. However, the following description may also be applied to the protrusions P3 and P4. That is, the first protrusion P1 may include first and second slanted surfaces SL11 and SL12, and the second protrusion P2 may include first and second slanted surfaces SL21 and SL22.

The first slanted surfaces SL11 and SL21 may be oriented toward the rear surface BS of the housing 310, rather than the front surface FS of the housing 310, and the second slanted surfaces SL12 and SL22 may be oriented toward the front surface FS of the housing 310, rather than the rear surface BS of the housing 310, and may be located opposite the first slanted surfaces SL11 and SL21.

As shown in FIG. 9A, the slopes of the second slanted surfaces SL12 and SL22 are less than the slopes of the first slanted surfaces SL11 and SL21. Accordingly, when the central portion CP is inserted into the first upper portion 310U of the housing 310 in the second direction, the second upper portion 336U may easily move over the protrusions P1 and P2 until all of the protrusions P1 and P2 are received in the cavity 330H. To this end, as shown in FIG. 7, an end portion 336UE of the second upper portion 336U may have a slanted side surface formed corresponding to the second slanted surfaces SL12 and SL22, and similar to the second upper portion 336U, an end portion 336LE of the second lower portion 336L may have a slanted side surface formed corresponding to the second slanted surfaces. Accordingly, the second upper portion 336U and the second lower portion 336L may more easily move over the protrusions P1, P2, P3, and P4.

As shown in FIG. 9A, the protrusions P1 and P2, which protrude from the upper side 310TS of the housing 310 in the third direction, are fitted into the cavity 330H in the central portion CP of the second upper portion 336U of the TPA, and the protrusions P3 and P4, which protrude from the lower side 310BS of the housing 310 in the third direction, are fitted into the cavity 330H in the central portion CP of the second lower portion 336L of the TPA, whereby the TPA of the CTPA 330 may be secured to the housing 310. Accordingly, the protrusions P1, P2, P3, and P4 may prevent the CTPA 330 from being separated from the housing 310 or moved in at least one of the first direction or the second direction after the CTPA 330 is coupled to the housing 310.

Figure 10A:
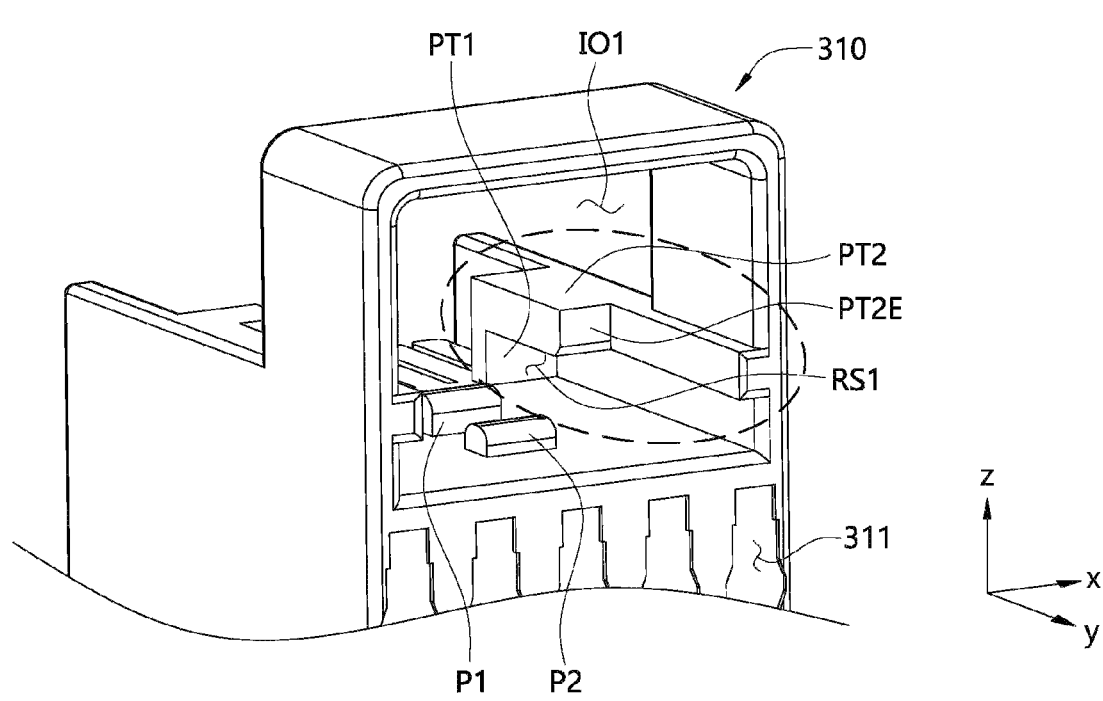
FIG. 10A is a partial perspective view of the upper end of the housing.
Figure 10B:
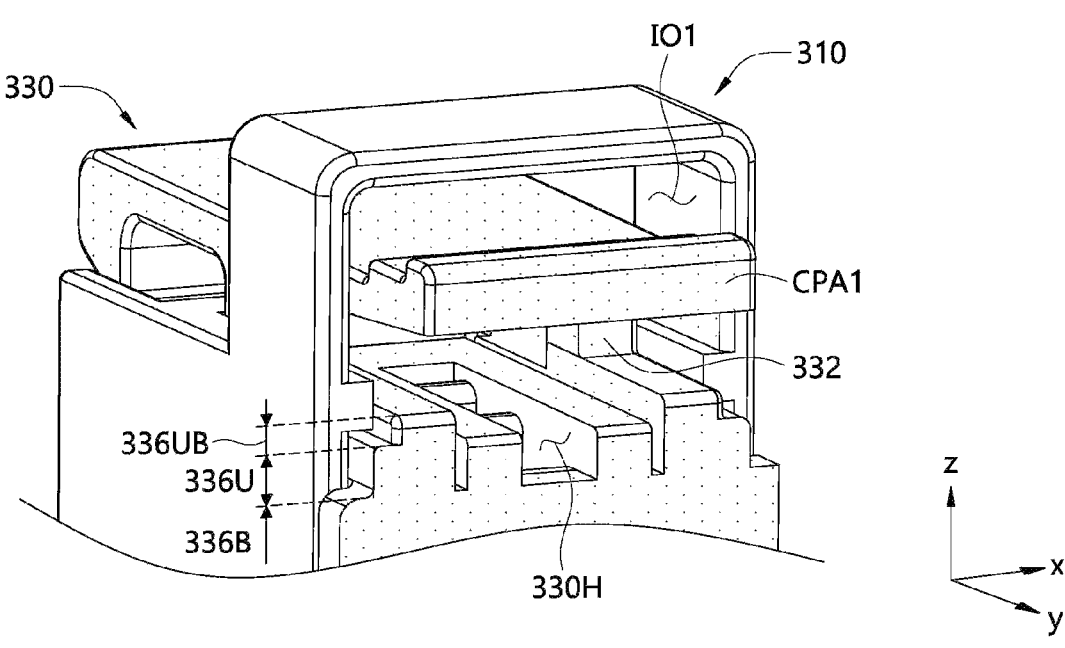
FIG. 10B is a partial perspective view of the upper end of the cell-monitoring connector.
Figure 10C:
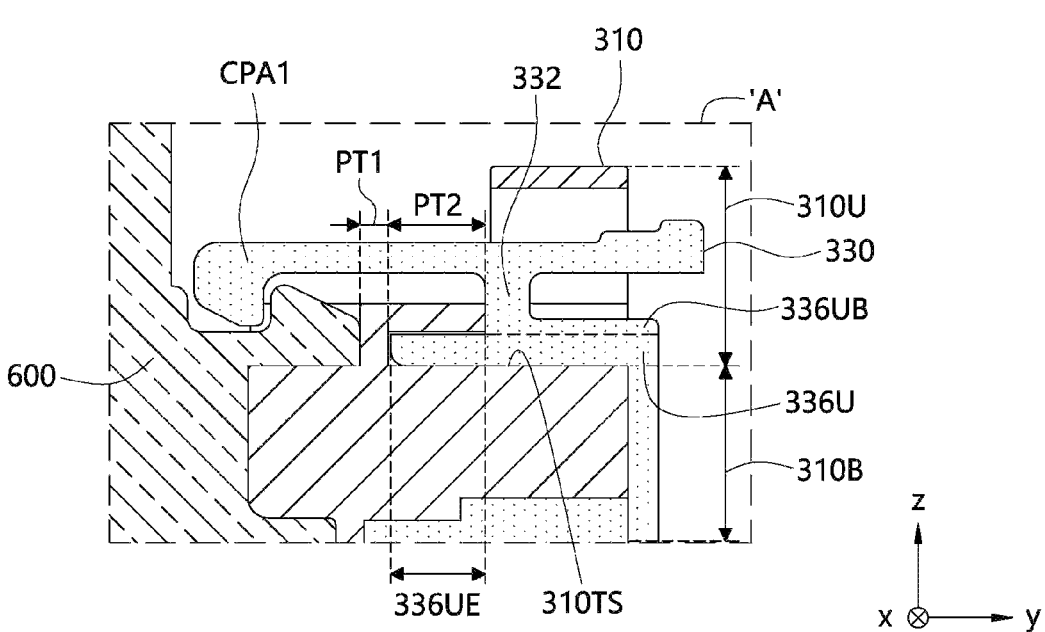
FIG. 10C is an enlarged view of portion 'A' in FIG. 4.

FIG. 10A is a partial perspective view of the upper end of the housing 310, FIG. 10B is a partial perspective view of the upper end of the cell-monitoring connector 300, and FIG. 10C is an enlarged view of portion 'A' in FIG. 4.

As shown in FIGS. 2 and 10A, the housing 310 may include first to fourth protruding portions PT1, PT2, PT3, and PT4.

Referring to FIGS. 2, 5A, 10A, and 10C, the first protruding portion PT1 protrudes from the upper side 310TS of the body 310B in the third direction, and the second protruding portion PT2 is bent and protrudes from an end of the first protruding portion PT1 toward the connecting portion 332 in the second direction. Therefore, the end portion 336UE of the second upper portion 336U of the TPA may be received in a first concave portion RS1, which is defined by the upper side 310TS of the body 310B, the first protruding portion PT1, and the second protruding portion PT2.

Similar to the first and second protruding portions PT1 and PT2, the third protruding portion PT3 protrudes from the lower side 310BS of the body 310B in the third direction, and the fourth protruding portion PT4 is bent and protrudes from an end of the third protruding portion PT3 toward the connecting portion 334 in the second direction. Therefore, the second lower portion 336L of the TPA may be received in a second concave portion, which is defined by the lower side 310BS of the body 310B, the third protruding portion PT3, and the fourth protruding portion PT4, and the end portion 336LE of the second lower portion 336L may be in contact with the third protruding portion PT3.

In addition, when the CTPA 330 is inserted into the housing 310 in the second direction, an end surface PT2E of the second protruding portion PT2 may come into contact with the connecting portion 332, and an end surface of the fourth protruding portion PT4 may come into contact with the connecting portion 334.

The connecting portions 332 and 334 serve to connect the CPAs CPA1 and CPA2 to the TPA.

The first connecting portion 332 serves to connect the second upper portion 336U of the TPA to the first CPA CPA1, and the second connecting portion 334 serves to connect the second lower portion 336L of the TPA to the second CPA CPA2. As shown in FIG. 7, the CPAs CPA1 and CPA2, the connecting portions 332 and 334, and the TPA may be integrally formed with each other.

Figure 11A:
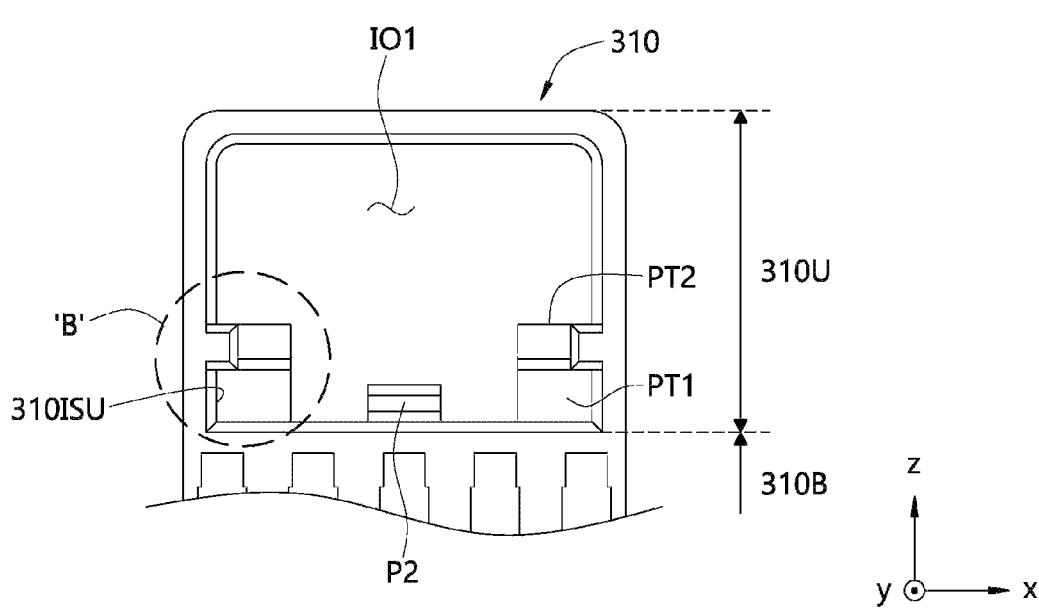
FIG. 11A is a partial front view of the housing.
Figure 11B:
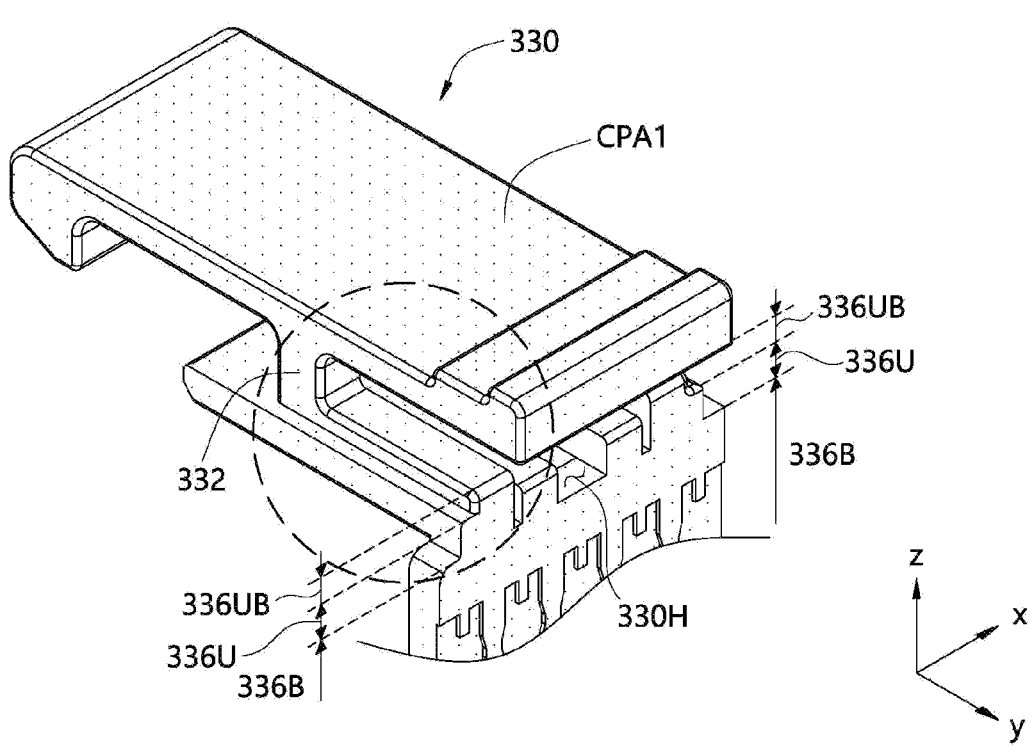
FIG. 11B is a partial perspective view of the CTPA.
Figure 11C:
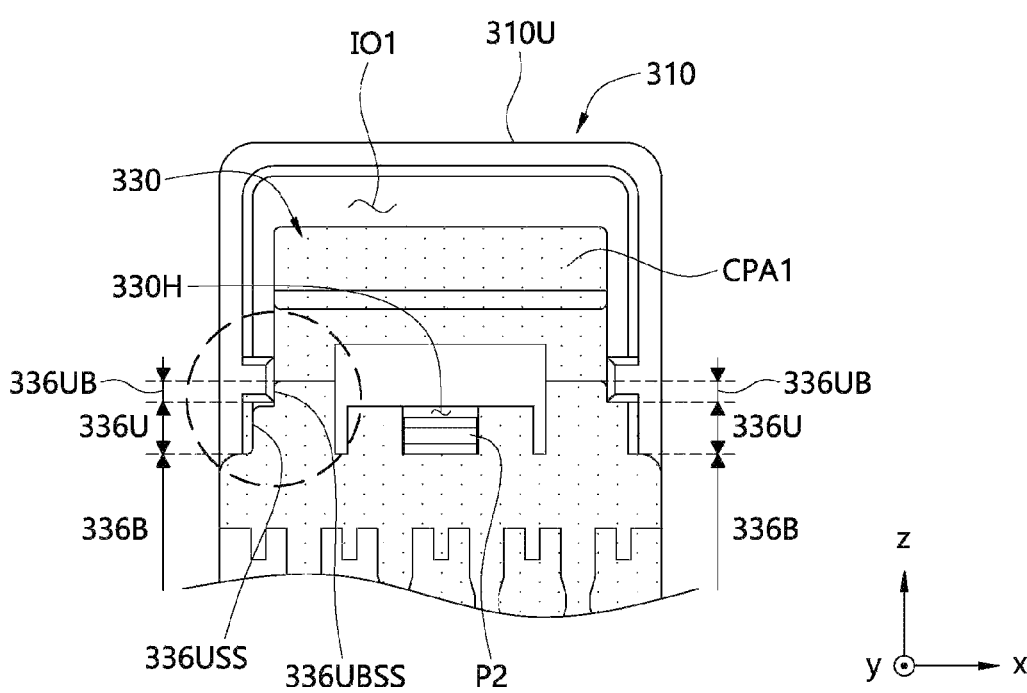
FIG. 11C is a partial front view of the cell-monitoring connector.

FIG. 11A is a partial front view of the housing 310, FIG. 11B is a partial perspective view of the CTPA 330, and FIG. 11C is a partial front view of the cell-monitoring connector 300.

According to the embodiment, the TPA may include first and second guide bars 336UB and 336LB.

The first guide bar 336UB may be disposed on the second upper portion 336U and may have a side surface 336UBSS that is stepped with respect to the side surface 336USS of the second upper portion 336U. The first guide bar 336UB may overlap at least one of the 1-$3^{rd}$ portion P13, the 1-$5^{th}$ portion P15, or the 1-$6^{th}$ portion P16 in the third direction. For example, the first guide bar 336UB may overlap the 1-$3^{rd}$ portion P13, the 1-5th portion P15, and the 1-$6^{th}$ portion P16 shown in FIG. 4 in the third direction. Referring to portion 'B' in FIG. 11A, the first upper portion 310U of the housing 310 may have an upper inner side surface 310ISU that is formed corresponding to the side surface 336USS of the second upper portion 336U and the side surface 336UBSS of the first guide bar 336UB and that guides insertion of the CTPA 330 in the second direction.

The second guide bar 336LB and the lower inner side surface 310ISL of the housing 310 may be respectively formed to be symmetrical with the first guide bar 336UB and the upper inner side surface 310ISU of the housing 310 in the third direction.

That is, the second guide bar 336LB may be disposed on the second lower portion 336L and may have a side surface that is stepped with respect to the side surface of the second lower portion 336L. The second guide bar 336LB may overlap at least one of the 2-$3^{rd}$ portion P23, the 2-$5^{th}$ portion P25, or the 2-$6^{th}$ portion P26 in the third direction. For example, the second guide bar 336LB may overlap the 2-$3^{rd}$ portion P23, the 2-$5^{th}$ portion P25, and the 2-$6^{th}$ portion P26 shown in FIG. 4 in the third direction. The first lower portion 310L of the housing 310 may have a lower inner side surface that is formed corresponding to the side surface of the second lower portion 336L and the side surface of the second guide bar 336LB and that guides insertion of the CTPA 330 in the second direction.

As described above, when the CTPA 330 slides to be coupled to the housing 310, the first and second guide bars 336UB and 336LB and the upper and lower inner side surfaces, which have the shapes illustrated in the drawings, may guide insertion of the CTPA 330 into the housing 310 in the second direction and may reduce shaking of the CTPA 330 in a direction intersecting the second direction. Accordingly, the CTPA 330 may be accurately aligned with the housing 310 and coupled thereto.

Meanwhile, the connection terminals 320 may be inserted into the through-holes 330T in the TPA and the connection terminal insertion holes 311 in the housing 310 and may be connected to the terminals 610 of the respective separators 600.

Figure 12A:
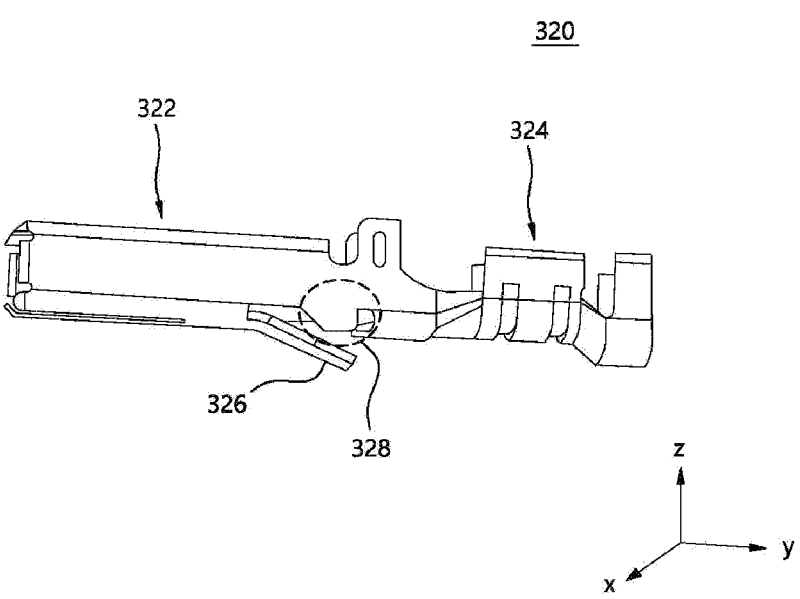
FIGS. 12A and 12B are, respectively, a perspective view and a plan view of a connection terminal according to an embodiment.
Figure 12B:
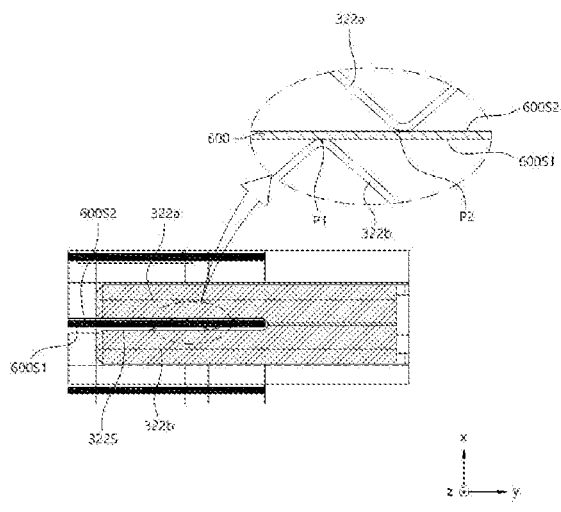

FIGS. 12A and 12B are, respectively, a perspective view and a plan view of the connection terminal 320 according to an embodiment.

Referring to FIG. 12A, the connection terminal 320 may include a terminal connection portion 322 and a wire-holding portion 324. The terminal connection portion 322 is inserted into a corresponding connection terminal insertion hole 311 to be connected to a corresponding separator 600. The wire-holding portion 324 extends from the terminal connection portion 322 to surround a wire (an electric wire) to hold the same.

Referring to FIG. 12B, the terminal connection portion 322 may include connection pieces 322a and 322b, which flexibly spread and contact two opposite surfaces 600S1 and 600S2 of the separator 600. The connection points P1 and P2 of the connection pieces 322a and 322b may be disposed so as to be offset from each other. As such, according to an embodiment, since the connection points P1 and P2 of the connection pieces 322a and 322b are offset from each other, when the separator 600 is inserted into a second slit 322S defined by the two connection pieces 322a and 322b, the contact force between the separator 600 and the connection pieces 322a and 322b may increase, and the separator 600 may be supported more flexibly. Thus, even when the separator 600 is implemented as an ultra-thin film having a thickness of 0.1 mm or less, the connection terminal 320 may be prevented from being unintentionally separated from the separator 600. That is, the force of holding the connection terminal 320 to the separator 600 may increase, which results in improved product reliability.

The terminal connection portion 322 of the connection terminal 320 may have a rectangular parallelepiped shape having an opening formed in the front side thereof, but the embodiments are not limited thereto.

In addition, the connection terminal 320 may further include a locking protrusion 326. The locking protrusion 326 may protrude from the lower surface of the terminal connection portion 322 toward the wire-holding portion 324. The locking protrusion 326 may have a shape that is bent and extends downwards from the lower surface of the terminal connection portion 322. In this case, the locking protrusion 326 shown in FIG. 12A catches in the housing 310, and thus the connection terminal 320 may be prevented from being separated from the housing 310 due to external vibration or impact, and connection thereof to the separator 600 may be maintained.

In addition, the connection terminal 320 may further include a connection guide portion 328. The connection guide portion 328 may prevent the connection terminal 320, connected to the separator 600 through the housing 310, from being separated from the separator 600.

Hereinafter, a process of coupling the cell-monitoring connector 300 according to an embodiment to the separators 600 will be described with reference to the accompanying drawings.

FIGS. 13A to 13D are views for explaining a process of coupling the cell-monitoring connector 300 according to an embodiment to the separators 600.

Figure 13A:
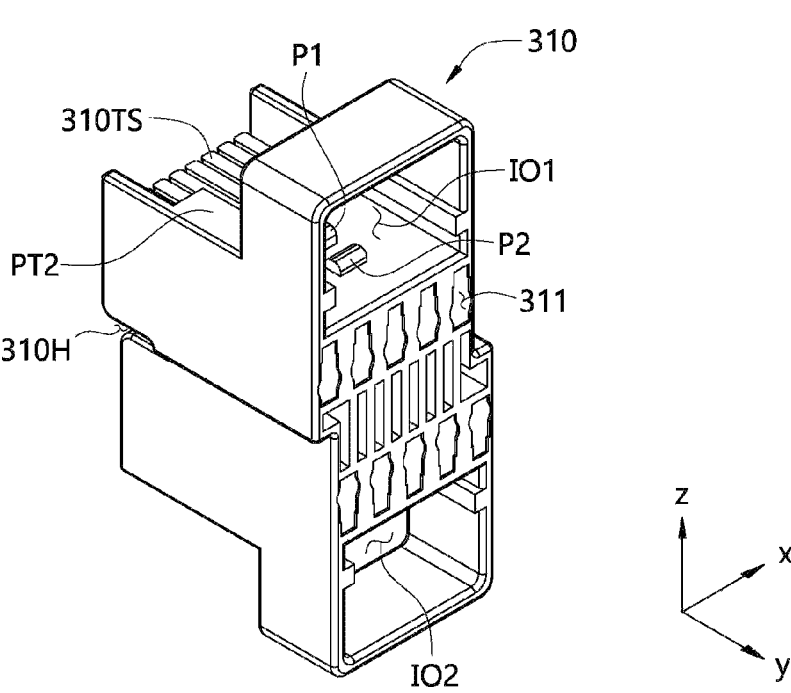
FIGS. 13A to 13D are views for explaining a process of coupling the cell-monitoring connector according to an embodiment to the separators.

First, as shown in FIG. 13A, the housing 310 is prepared.

Figure 13B:
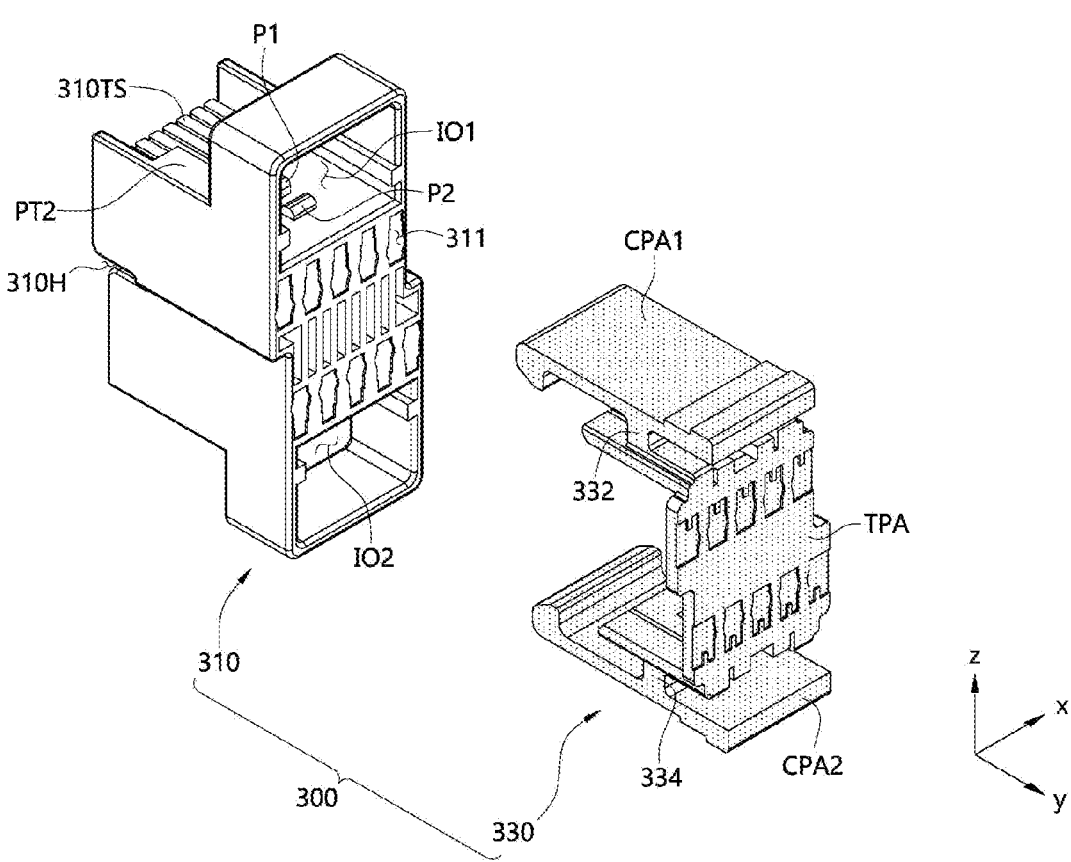
Figure 13C:
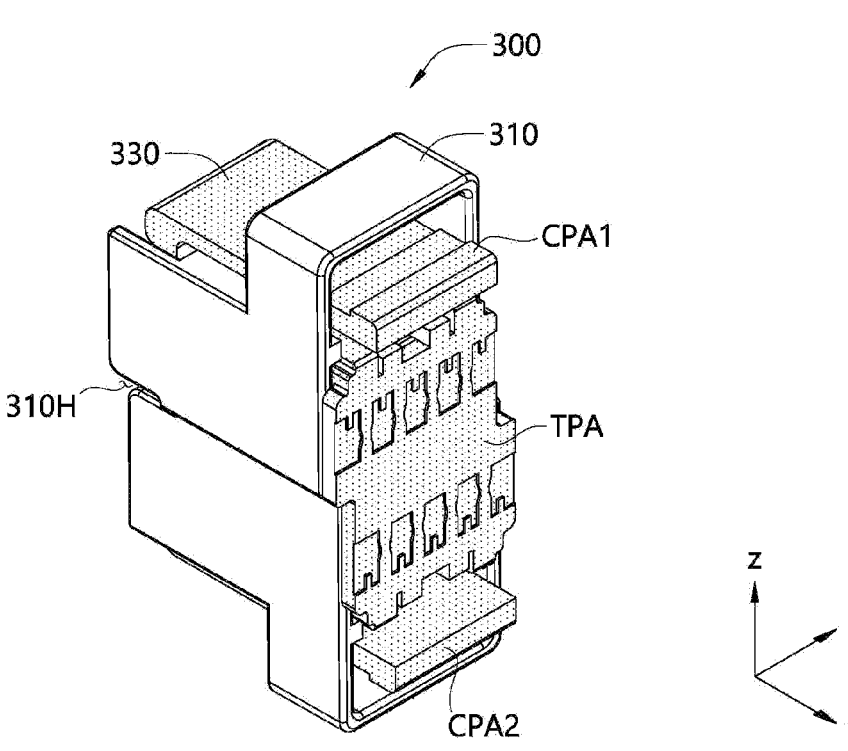

Thereafter, the CTPA 330 is moved forwards in the second direction indicated by the arrow, as shown in FIG. 13B, and is coupled to the housing 310, as shown in FIG. 13C.

Figure 13D:
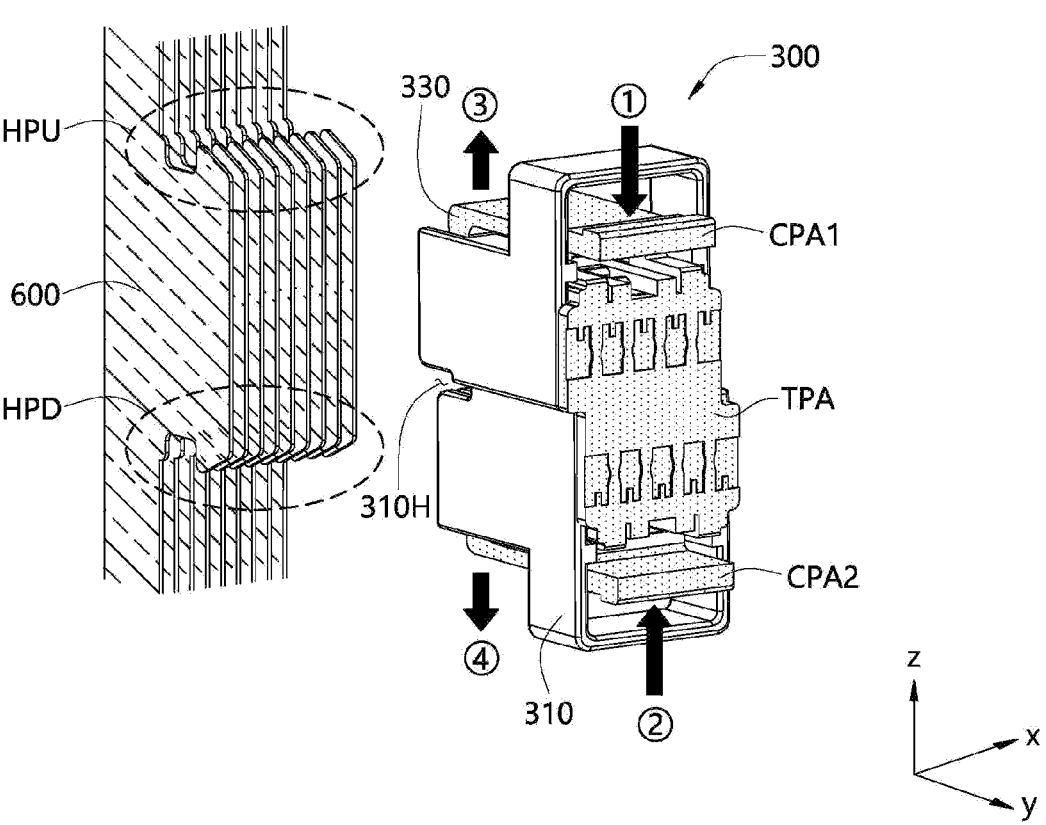

Thereafter, as shown in FIG. 13D, the push portion 414 of the first CPA CPA1 and the push portion 414 of the second CPA CPA2 are respectively pushed in the direction ① and the direction ② at the same time, and thus the locking protrusion 412 of the first CPA CPA1 and the locking protrusion 412 of the second CPA CPA2 are respectively moved in the direction ③ and the direction ④ at the same time by the principle of leverage. The connector 300 in this state is moved such that the locking protrusion 412 of the first CPA CPA1 and the locking protrusion 412 of the second CPA CPA2 are respectively located adjacent to the upper groove portion HPU and the lower groove portion HPD in the separators 600.

Thereafter, the force of pushing the push portion 414 of the first CPA CPA1 in the direction ① and the force of pushing the push portion 414 of the second CPA CPA2 in the direction ② are released at the same time, and thus the locking protrusion 412 of the first CPA CPA1 and the locking protrusion 412 of the second CPA CPA2 are respectively moved in a direction opposite the direction ③ and a direction opposite the direction ④ at the same time by the principle of leverage and are respectively locked in the upper groove portion HPU and the lower groove portion HPD. As a result, the connector 300 may be coupled to the separators 600, as shown in FIG. 3.

As described above, in order to allow the locking protrusion 412 of the first CPA CPA1 and the locking protrusion 412 of the second CPA CPA2 to move at the same time, the 1-1$^{st}$ portion P11 of the first CPA CPA1 and the 2-1$^{st}$ portion P21 of the second CPA CPA2 may overlap each other in the third direction, and the 1-6$^{th}$ portion P16 of the first CPA CPA1 and the 2-6$^{th}$ portion P26 of the second CPA CPA2 may overlap each other in the third direction. That is, it can be seen that the levers 410 and the connecting portions 332 and 334 operate based on the principle of leverage.

Thereafter, the connection terminals 320 may be inserted into the TPA.

Hereinafter, a process of removing (or separating) the cell-monitoring connector 300 according to an embodiment from the separators 600 will be described with reference to FIGS. 13A to 13D.

A process of removing the connector 300 from the separators 600 may be performed in an order opposite the order in which the process of coupling the connector 300 to the separators 600 is performed.

First, in the state in which the connector 300 is coupled to the separators 600, as shown in FIG. 3, the push portion 414 of the first CPA CPA1 and the push portion 414 of the second CPA CPA2 are respectively pushed in the direction ① and the direction ② at the same time, as shown in FIG. 13D. Thereby, the locking protrusion 412 of the first CPA CPA1 and the locking protrusion 412 of the second CPA CPA2 are respectively moved in the direction ③ and the direction ④ at the same time by the principle of leverage and thus are separated and unlocked from the upper groove portion HPU and the lower groove portion HPD in the separators 600.

In the state in which the connector 300 is separated from the separators 600, as shown in FIG. 13C, the CTPA 330 is removed from the housing 310 in a direction opposite the arrow shown in FIG. 13B.

Hereinafter, processes of coupling and separating a cell-monitoring connector 10 according to a comparative example to and from separators 60 will be described with reference to FIGS. 14 and 15.

Figure 14:
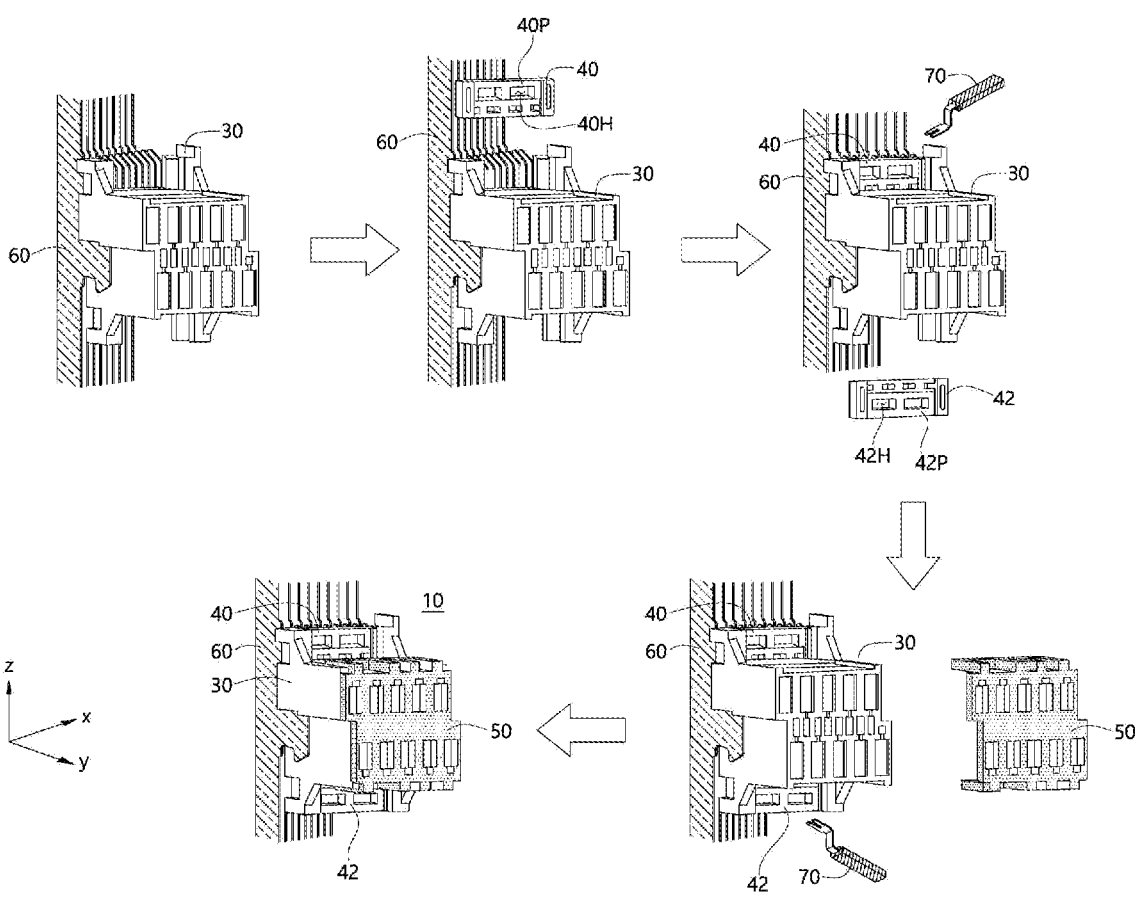
FIG. 14 is a perspective view for explaining a process of coupling a cell-monitoring connector according to a comparative example to separators.
Figure 15:
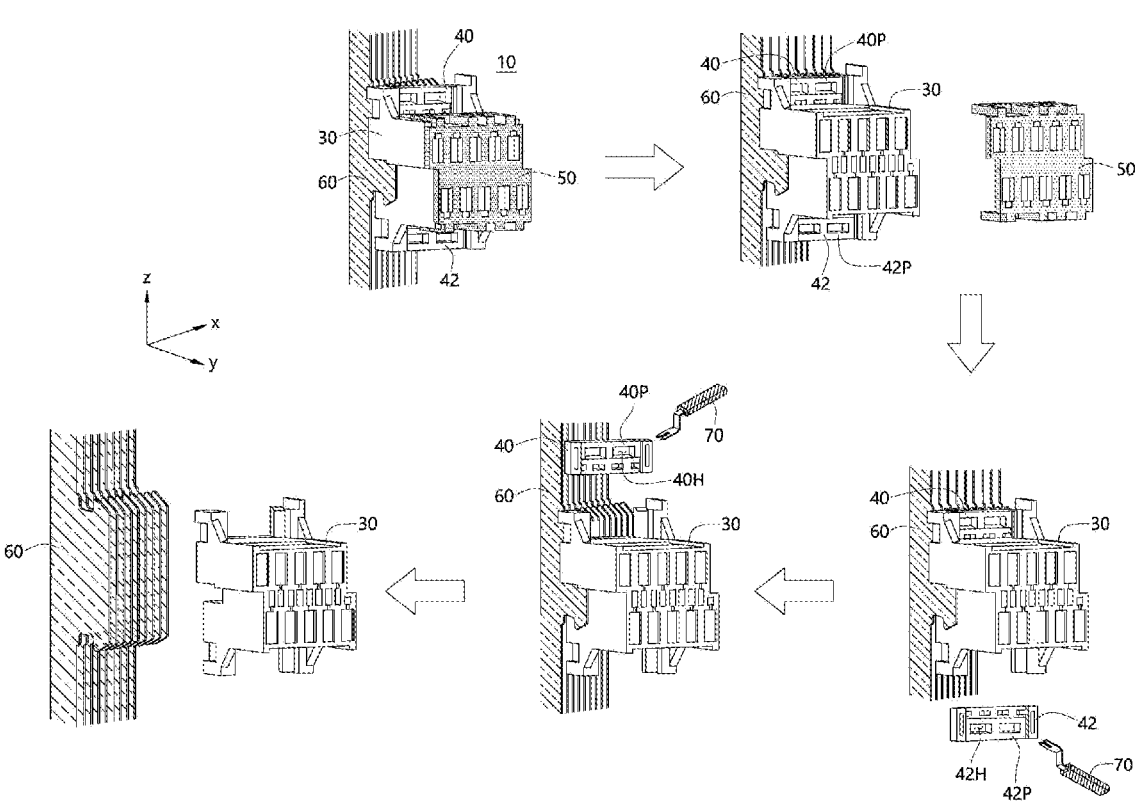
FIG. 15 is a perspective view for explaining a process of separating the cell-monitoring connector according to the comparative example from the separators.

FIG. 14 is a perspective view for explaining a process of coupling a cell-monitoring connector 10 according to a comparative example to separators 60, and FIG. 15 is a perspective view for explaining a process of separating the cell-monitoring connector 10 according to the comparative example from the separators 60.

The housing 30, the first CPA 40, the second CPA 42, the TPA 50, and the separators 60 shown in FIGS. 14 and 15 respectively perform the same functions as the housing 310, the first CPA CPA1, the second CPA CPA2, the TPA, and the separators 600 according to the embodiment, and thus a duplicate description thereof will be omitted.

A process of coupling the connector 10 to the separators 60 will be described with reference to FIG. 14.

First, the housing 30 is coupled to the separators 60.

Thereafter, the first CPA 40 is pressed in the direction indicated by the arrow to be coupled to the upper side of the housing 30. Thereafter, the second CPA 42 is pressed in the direction indicated by the arrow to be coupled to the lower side of the housing 30. In this case, because of thin wall portions 40P and 42P of the first and second CPAs 40 and 42, it is not possible to manually press the first and second CPAs 40 and 42, and a separate tool 70 is used to press the same.

Thereafter, the TPA 50 is coupled to the housing 30 in the direction indicated by the arrow. Thereafter, although not shown, connection terminals are inserted into the TPA 50, thereby completing coupling of the connector 10 to the separators 60.

A process of separating the connector 10 from the separators 60 will be described with reference to FIG. 15.

In the state in which the connector 10 is coupled to the separators 60, the TPA 50 is separated from the housing 30 in the direction indicated by the arrow. Thereafter, a tool 70 is inserted into a hole 42H in the second CPA 42 to separate the second CPA 42 from the housing 30, and then is inserted into a hole 40H in the first CPA 40 to separate the first CPA 40 from the housing 30. Alternatively, in an order opposite the above order, the tool 70 may be inserted into the hole 40H in the first CPA 40 to separate the first CPA 40 from the housing 30, and may then be inserted into the hole 42H in the second CPA 42 to separate the second CPA 42 from the housing 30.

As described above, in order to couple or separate the cell-monitoring connector 10 according to the comparative example to or from the separators 60, a separate tool 70 needs to be used. The reason for this is that the area of the upper surface of each of the first and second CPAs 40 and 42 is very small, thus making it difficult to manually perform the coupling process or the separating process. When the first and second CPAs 40 and 42 are sequentially coupled to or separated from the housing 30 using the tool 70, the time required for coupling or separating the cell-monitoring connector 10 to or from the separators 60 may be increased. Further, such a process using the tool 70 may impose a burden on a worker, and thus may further increase the time required for coupling and separating.

Furthermore, when the tool 70 is inserted into each of the holes 40H and 42H in the first and second CPAs 40 and 42 to couple or separate the first and second CPAs 40 and 42 in the third direction, an excessive amount of force may be transmitted to the first and second CPAs 40 and 42 via the tool 70, which may lead to damage to the wall portions 40P and 42P of the first and second CPAs 40 and 42.

In contrast, according to the embodiments, a worker may couple the CTPA 330, in which two CPAs CPA1 and CPA2 are integrated with the TPA via the connecting portions 332 and 334, to the housing 310, and then may manually push the push portions 414 to couple the connector 300 to the separators 600.

Accordingly, the time required for coupling or separating the cell-monitoring connector 300 to or from the separators 600 may be shortened, and a worker may easily and conveniently perform the coupling process or the separating process without the necessity of using a separate tool 70. Further, the insertion holes 40H and 42H, into which the tool 70 is inserted in order to assemble or remove the first CPA CPA1 and the second CPA CPA2 of the cell-monitoring connector 300 to or from the groove portions HPU and HPD, do not need to be formed in the first CPA CPA1 and the second CPA CPA2. Accordingly, the CPAs CPA1 and CPA2 may be prevented from being damaged due to force applied thereto via the tool 70.

As described above, four components 30, 40, 42, and 50 are assembled to fabricate the cell-monitoring connector 10 according to the comparative example, whereas two components 310 and 330 are assembled to fabricate the cell-monitoring connector 300 according to the embodiments. As a result, according to the embodiments, a process of coupling or separating the cell-monitoring connector 300 to or from the separators 600 may be simplified, a manufacturing time or a working time may be shortened, and workability may be improved, compared to the comparative example.

As is apparent from the above description, since a relatively small number of components, i.e., two components, are assembled to fabricate the cell-monitoring connector for a fuel cell according to the embodiments, a process of coupling or separating the cell-monitoring connector to or from separators may be simplified, a time required for the process may be shortened, and workability may be improved.

However, the effects achievable through the embodiments are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A cell-monitoring connector for a fuel cell, the cell-monitoring connector being configured to be mounted to a plurality of unit cells stacked in a first direction, the cell-monitoring connector comprising:

a housing configured to be coupled to a plurality of terminals protruding from side portions of separators included in each of the plurality of unit cells toward the cell-monitoring connector in a second direction intersecting the first direction; and a connector and terminal position assurance (CTPA) configured to be detachably coupled to the housing, the CTPA comprising:

a connector position assurance (CPA) configured to be locked in a groove portion defined by receiving recesses provided in the plurality of terminals overlapping each other in the first direction and to secure the housing to the plurality of terminals;

a terminal position assurance (TPA) configured to be detachably coupled to a front surface of the housing and to allow connection terminals to be press-fitted into the housing; and a connecting portion interconnecting the CPA and the TPA;

wherein the housing comprises:

a body configured to be coupled to the plurality of terminals;

a first upper portion extending from an upper side of the body in a third direction and having a first insertion opening formed therethrough in the second direction, the third direction being a direction intersecting the first direction and the second direction; and a first lower portion extending from a lower side of the body in the third direction and having a second insertion opening formed therethrough in the second direction, the lower side being opposite the upper side; and wherein the CPA comprises:

a first CPA configured to be detachably coupled to the first upper portion in the second direction through the first insertion opening and to be locked in the groove portion defined by the receiving recesses provided in upper portions of the plurality of terminals overlapping each other in the first direction; and a second CPA configured to be detachably coupled to the first lower portion in the second direction through the second insertion opening and to be locked in the groove portion defined by the receiving recesses provided in lower portions of the plurality of terminals overlapping each other in the first direction.

2. The cell-monitoring connector according to claim 1, wherein the TPA comprises:

a main body configured to allow the connection terminals to be inserted thereinto;

a second upper portion bent and extending from an upper side of the main body in the second direction; and a second lower portion bent and extending from a lower side of the main body in the second direction.

3. The cell-monitoring connector according to claim 2, wherein the housing comprises:

a first protruding portion protruding from the upper side of the body in the third direction;

a second protruding portion bent and protruding from an end portion of the first protruding portion toward the connecting portion in the second direction;

a third protruding portion protruding from the lower side of the body in the third direction; and a fourth protruding portion bent and protruding from an end portion of the third protruding portion toward the connecting portion in the second direction.

4. The cell-monitoring connector according to claim 3, wherein:

the second upper portion of the TPA has an end portion received in a first concave portion defined by the upper side of the body, the first protruding portion, and the second protruding portion; and the second lower portion of the TPA has an end portion received in a second concave portion defined by the lower side of the body, the third protruding portion, and the fourth protruding portion.

5. The cell-monitoring connector according to claim 2, wherein the second upper portion or the second lower portion comprises:

a central portion having a cavity defined therethrough in the third direction; and peripheral portions connected to the connecting portion and disposed on both sides of the central portion in the first direction.

6. The cell-monitoring connector according to claim 5, wherein the housing comprises a plurality of protrusions protruding from the body toward the cavity in the third direction and disposed so as to be spaced apart from each other in the second direction.

7. The cell-monitoring connector according to claim 6, wherein each of the plurality of protrusions comprises:

a first slanted surface oriented toward a rear surface of the housing rather than the front surface of the housing; and a second slanted surface oriented toward the front surface of the housing rather than the rear surface of the housing and located opposite the first slanted surface;

wherein the second slanted surface has an inclination less than an inclination of the first slanted surface; and wherein the second upper portion or the second lower portion has an end portion slanted corresponding to the second slanted surface.

8. The cell-monitoring connector according to claim 2, wherein the connecting portion comprises:

a first connecting portion interconnecting the second upper portion and the first CPA; and a second connecting portion interconnecting the second lower portion and the second CPA.

9. The cell-monitoring connector according to claim 8, wherein each of the first CPA and the second CPA comprises:

a lever supported by the connecting portion;

a locking protrusion disposed on one of two opposite end portions of the lever to be locked in the groove portion; and a push portion disposed on a remaining one of the two opposite end portions of the lever.

10. The cell-monitoring connector according to claim 9, wherein the locking protrusion, the push portion, and the lever of the first CPA have sectional shapes symmetrical with sectional shapes of the locking protrusion, the push portion, and the lever of the second CPA in the third direction.

11. The cell-monitoring connector according to claim 9, wherein the push portion comprises a plurality of stepped surfaces having a height difference therebetween in the third direction.

12. The cell-monitoring connector according to claim 9, wherein:

the first CPA comprises:

a $1\text{-}1^{st}$ portion in which the locking protrusion is located;

a $1\text{-}2^{nd}$ portion connected to the first connecting portion;

a $1\text{-}3^{rd}$ portion located in the first insertion opening;

a $1\text{-}4^{th}$ portion interconnecting the $1\text{-}1^{st}$ portion and the $1\text{-}2^{nd}$ portion and overlapping the upper side of the body in the third direction;

a $1\text{-}5^{th}$ portion interconnecting the $1\text{-}2^{nd}$ portion and the $1\text{-}3^{rd}$ portion and overlapping the upper side of the body in the third direction; and a $1\text{-}6^{th}$ portion in which at least part of the push portion is located; and the second CPA comprises:

a $2\text{-}1^{st}$ portion in which the locking protrusion is located;

a $2\text{-}2^{nd}$ portion connected to the second connecting portion;

a $2\text{-}3^{rd}$ portion located in the second insertion opening;

a $2\text{-}4^{th}$ portion interconnecting the $2\text{-}1^{st}$ portion and the $2\text{-}2^{nd}$ portion and overlapping the lower side of the body in the third direction;

a $2\text{-}5^{th}$ portion interconnecting the $2\text{-}2^{nd}$ portion and the $2\text{-}3^{rd}$ portion and overlapping the lower side of the body in the third direction; and a $2\text{-}6^{th}$ portion in which at least part of the push portion is located.

13. The cell-monitoring connector according to claim 12, wherein:

the 1-1$^{st}$ portion and the 2-1$^{st}$ portion overlap each other in the third direction; and the 1-6$^{th}$ portion and the 2-6$^{th}$ portion overlap each other in the third direction.

14. The cell-monitoring connector according to claim 12, wherein:

the TPA further comprises a first guide bar disposed on the second upper portion and having a side surface stepped with respect to a side surface of the second upper portion; and the first upper portion of the housing comprises an upper inner side surface corresponding to the first guide bar and configured to guide insertion of the CTPA in the second direction.

15. The cell-monitoring connector according to claim 14, wherein the first guide bar overlaps the 1-3$^{rd}$ portion, the 1-5$^{th}$ portion, or the 1-6$^{th}$ portion in the third direction.

16. The cell-monitoring connector according to claim 12, wherein:

the TPA further comprises a second guide bar disposed on the second lower portion and having a side surface stepped with respect to a side surface of the second lower portion; and the first lower portion of the housing comprises a lower inner side surface corresponding to the second guide bar and configured to guide insertion of the CTPA in the second direction.

17. The cell-monitoring connector according to claim 16, wherein the second guide bar overlaps the 2-3$^{rd}$ portion, the 2-5$^{th}$ portion, or the 2-6$^{th}$ portion in the third direction.

18. A cell-monitoring connector for a fuel cell, the cell-monitoring connector being configured to be mounted to a plurality of unit cells stacked in a first direction, the cell-monitoring connector comprising:

a housing configured to be coupled to a plurality of terminals protruding from side portions of separators included in each of the plurality of unit cells toward the cell-monitoring connector in a second direction intersecting the first direction; and a connector and terminal position assurance (CTPA) configured to be detachably coupled to the housing, the CTPA comprising:

a connector position assurance (CPA) configured to be locked in a groove portion defined by receiving recesses provided in the plurality of terminals overlapping each other in the first direction and to secure the housing to the plurality of terminals;

a terminal position assurance (TPA) configured to be detachably coupled to a front surface of the housing and to allow connection terminals to be press-fitted into the housing; and a connecting portion interconnecting the CPA and the TPA;

wherein the housing comprises:

a body configured to be coupled to the plurality of terminals;

a first upper portion extending from an upper side of the body in a third direction and having a first insertion opening formed therethrough in the second direction, the third direction being a direction intersecting the first direction and the second direction; and a first lower portion extending from a lower side of the body in the third direction and having a second insertion opening formed therethrough in the second direction, the lower side being opposite the upper side;

wherein the CPA comprises:

a first CPA configured to be detachably coupled to the first upper portion in the second direction through the first insertion opening and to be locked in the groove portion defined by the receiving recesses provided in upper portions of the plurality of terminals overlapping each other in the first direction; and a second CPA configured to be detachably coupled to the first lower portion in the second direction through the second insertion opening and to be locked in the groove portion defined by the receiving recesses provided in lower portions of the plurality of terminals overlapping each other in the first direction; and wherein the CPA, the TPA, and the connecting portion are integrally formed with each other.

19. The cell-monitoring connector according to claim 18, wherein the TPA comprises:

a main body configured to allow the connection terminals to be inserted thereinto;

a second upper portion bent and extending from an upper side of the main body in the second direction; and a second lower portion bent and extending from a lower side of the main body in the second direction.

20. The cell-monitoring connector according to claim 19, wherein the housing comprises:

a first protruding portion protruding from the upper side of the body in the third direction;

a second protruding portion bent and protruding from an end portion of the first protruding portion toward the connecting portion in the second direction;

a third protruding portion protruding from the lower side of the body in the third direction; and a fourth protruding portion bent and protruding from an end portion of the third protruding portion toward the connecting portion in the second direction.

* * * * *